(12) United States Patent
Schutze et al.

(10) Patent No.: US 7,272,419 B1
(45) Date of Patent: Sep. 18, 2007

(54) METHOD FOR TRANSMITTING SYMBOLS AND/OR INFORMATION FROM A SENDER TO A RECIPIENT

(75) Inventors: Petra Schutze, Berlin (DE); Nils Scharmberg, Berlin (DE); Christof Florek, Berlin (DE)

(73) Assignee: Freie Erfindungskünstler GmbH, Berlin (DE)

( * ) Notice: Subject to any disclaimer, the term of this patent is extended or adjusted under 35 U.S.C. 154(b) by 0 days.

(21) Appl. No.: 09/979,460

(22) PCT Filed: May 12, 2000

(86) PCT No.: PCT/EP00/04339

§ 371 (c)(1),
(2), (4) Date: Nov. 14, 2001

(87) PCT Pub. No.: WO00/70848

PCT Pub. Date: Nov. 23, 2000

(30) Foreign Application Priority Data

| May 14, 1999 | (DE) | ................................. 199 22 068 |
| May 19, 1999 | (DE) | ................................. 199 23 026 |
| Aug. 20, 1999 | (DE) | ................................. 199 40 954 |
| Aug. 27, 1999 | (DE) | ................................. 199 41 642 |
| Oct. 29, 1999 | (DE) | ................................. 199 54 032 |

(51) Int. Cl.
*H04Q 7/20* (2006.01)

(52) U.S. Cl. .................. 455/566; 455/466; 455/412.1; 455/414.1

(58) Field of Classification Search ................ 455/566, 455/466, 412.1, 412.2, 412.3, 413, 414.1, 455/422.1, 550, 553; 340/7.53, 7.56
See application file for complete search history.

(56) References Cited

U.S. PATENT DOCUMENTS

| 4,330,780 | A | | 5/1982 | Masaki ...................... 340/7.53 |
| 4,479,124 | A | | 10/1984 | Rodrigues et al. ......... 340/7.57 |
| 5,761,279 | A | | 6/1998 | Bierman et al. ......... 379/93.23 |
| 5,805,981 | A | * | 9/1998 | Sugio et al. ............... 340/7.56 |
| 6,104,924 | A | * | 8/2000 | Shirai .......................... 455/566 |

FOREIGN PATENT DOCUMENTS

| DE | 35 12 788 | 8/1986 |
| DE | 35 17 818 | 11/1986 |
| DE | 37 05 554 | 9/1988 |
| DE | 38 23 724 | 2/1989 |
| DE | 39 01 023 | 7/1990 |
| DE | 39 18 668 | 12/1990 |
| DE | 40 39 970 | 6/1992 |
| DE | 41 03 277 | 8/1992 |
| DE | 41 23 465 | 1/1993 |
| DE | 42 37 987 | 5/1994 |
| DE | 43 43 294 | 6/1995 |
| DE | 44 31 707 | 9/1995 |
| DE | 195 47 742 | 7/1997 |
| DE | 196 10 840 | 9/1997 |
| DE | 196 43 736 | 10/1997 |

(Continued)

*Primary Examiner*—Philip J. Sobutka
(74) *Attorney, Agent, or Firm*—Edwin D. Schindler

(57) ABSTRACT

The invention relates to a method for transmitting symbols and/or information from a transmitter to a receiver. The method further relates to devices for coding, transmitting, and receiving symbols and/or information.

It is specified that the symbols and/or information is converted into speech expressions and is transmitted as such.

29 Claims, 21 Drawing Sheets

EARTH

FOREIGN PATENT DOCUMENTS

| | | |
|---|---|---|
| DE | 196 22 729 | 12/1997 |
| DE | 297 15 998 | 12/1997 |
| DE | 690 30 910 | 1/1998 |
| DE | 197 06 596 | 8/1998 |
| DE | 197 09 508 | 1/1999 |
| DE | 692 26 730 | 3/1999 |
| DE | 298 21 998 | 5/1999 |
| DE | 198 03 081 | 7/1999 |
| EP | 0 412 574 | 2/1991 |
| EP | 0 752 793 | 1/1997 |
| WO | WO97/19429 | 5/1997 |
| WO | WO98/27778 | 6/1998 |
| WO | WO98/56197 | 12/1998 |
| WO | WO 00/57617 | 9/2000 |

* cited by examiner

HEART WITH ARROW

HEART

HOUSE

MOPED

GLASSES

LUCK

TENNIS

WINE

TEA / COFFEE

⟷ FOOD

⟷ BALL

⟷ BEER

⟷ BOOK

⟷ GLASS

MUSIC

EARTH

SUN

TREE

←→ CAR

←→ SMOKING

←→ PC

←→ EARPHONES

←→ LETTER

RINGS

KISSING MOUTH

| 5 | ○ | POINT a |
|---|---|---|
| 6 | ○ | POINT b |
| 7 | ◯◯ | POINT c |
| 8 | ♡ | POINT d |
| 9 | ♡ | POINT e |

FIG. 30

| 10 | 🕺 🏃 | PAIR a |
|---|---|---|
| 11 | 🚶 🚶 | PAIR b |
| 12 | 👬 | PAIR c |
| 13 | 💑 | PAIR d |

FIG. 31

| 14 |  | CAKE a |
| 15 |  | CAKE b |
| 16 |  | CAKE c |
| 17 |  | CAKE d |
| 18 |  | CAKE e |

| 19 |  | FACE a |
| 20 |  | FACE b |
| 21 |  | FACE c |
| 22 |  | FACE d |
| 23 |  | FACE e |

| 14 |  | DEVIL a |
| 15 |  | DEVIL b |
| 16 |  | DEVIL c |
| 17 |  | DEVIL d |
| 18 |  | DEVIL e |

METHOD FOR TRANSMITTING SYMBOLS AND/OR INFORMATION FROM A SENDER TO A RECIPIENT

BACKGROUND OF THE INVENTION

The invention relates to a method for transmitting symbols and/or information from a transmitter to a receiver. Further, the invention relates to devices for coding, transmitting, and receiving symbols and/or information.

Such methods and devices are known from the prior art. Such devices and methods are used, for example, in modern mobile telephones. For example, in these mobile telephones, certain symbols are chosen when the user of the transmitting mobile telephone sends an SMS message. [Alternate translation: In these mobile telephones, for example when an SMS message is sent, the user of the transmitting mobile telephone chooses certain symbols.] In the prior art, these are generally the standard symbols "+", "−", ".", ",", "''", "?", "!", "*", "/", ("," ), "<", "=", ">", "%", "&", "§", "$". "@". These symbols are then transmitted as a symbol.

Methods and devices for transmitting information from a transmitter to a receiver are known from the prior art. These methods and devices are used, for example, in mobile telephones. Besides voice transmissions, the transmission of so-called SMS (short message service) is also known. In this connection, reference is made, for example, to Connect 8/99 page 30 ff. Accordingly, short messages can be transmitted by mobile telephones (transmitters), via a short message service central of a service provider, to another mobile telephone (receiver). Voice messages can be transmitted by means of such short messages.

However, a disadvantage of the mobile telephones known from the prior art, and specifically of the methods and devices, known from the prior art, for transmitting symbols from one mobile telephone to another, is that the symbols are transmitted as such.

The transmission of symbols and/or information then requires a substantial amount of data. This again entails a considerable amount of time, which is needed to transmit the symbols and/or information.

Another disadvantage is that only a limited number of symbols and/or information can be transmitted in the prior art. The reason for this primarily also is the considerable amount of data needed for the symbols and/or information. All this data must be transmitted when the symbols and/or information are transmitted.

However, the users of the mobile telephone have a significant need also to be able to transmit other symbols and/or information without their telephone bill, meaning the time needed to transmit the symbols, rising above the fee.

A disadvantage of the known devices and methods for transmitting audio information from a transmitter to a receiver is that, in the prior art, the audio information itself, that means e.g. tone signals and the like, is irregularly transmitted from the transmitter to the receiver. This means, for example in the case of electromagnetic transmission, which means transmission by electromagnetic waves, such as is customary, for example, for mobile telephones, that the tone signals themselves are transmitted. This means that they are converted into modulations of the transmission frequency, and are transmitted. In the prior art, this results in a substantial amount of data, which is needed to transmit tone signals. For example, in the case of digital transmission, each individual tone signal must be converted into a sequence of fehlen bits, and then this fehlen bit information must be transmitted. These necessary, extensive amounts of data again demand a certain amount of time, which extends or delays the transmission.

It is also known how to integrate game functions into mobile telephones. In this connection, reference is made, for example, to Connection Manual 8/99 page 20. These game functions can be invoked on a display device of the mobile telephone and can be used internally by an operator.

SUMMARY OF THE INVENTION

It is therefore the object of the present invention to further develop methods and devices of the type mentioned in the introduction, in such a way that the above disadvantages are avoided and that it is possible to transmit symbols in less time and to expand the transmission of information.

This object is achieved by a method with the characteristics cited in claim 1, in that the following steps are executed: A particular symbol is selected on the transmitting end; a speech expression associated with the symbol is found on the transmission end; the speech expression is transmitted from the transmitter to the receiver; the symbol associated with the speech expression is found on the receiving end.

The advantages of this procedure are especially that, through the invention, the speech expressions must now be transmitted from the transmitter to the receiver. For example, if the user of a device using this method chooses to transmit the symbol sun, only the word "sun" must be transmitted, and no longer the symbol in itself. However, transmission of the word "sun" requires much less transmission time, so that the transmission process is performed more quickly and economically. On the receiving side, the speech expression is then again converted into the symbol associated with it, so that the receiver of the message then sees the sun symbol on his display or the like.

In a preferred embodiment, the particular symbol can be chosen from a symbol table on the transmitting side. This can be done, for example, by means of a display. For example, the user of a mobile telephone can pick a particular symbol to transmit from a whole series of them on a display or on a table of symbols. The mobile telephone will then internally convert the chosen symbol into the corresponding word or into the corresponding speech expression and will transmit this speech expression. Such a symbol table significantly simplifies the selection of symbols for the user. The symbols or the symbol table preferably are first stored in a memory.

In another preferred embodiment, a microprocessor controls the selection of the symbols and/or the association of the speech expression to the selected symbol and/or the transmission and also reception of the speech expression. The method thus is preferably implemented with a device which has integrated on one board the memory for storing the symbol table and the associated speech expressions, the microprocessor, and the input unit or keyboard. The method thus can be used completely in modern mobile telephones, since it requires no additional prerequisites which could not be integrated into known mobile telephones. The inventive method and the inventive device for transmitting symbols from a transmitter to a receiver consequently can be applied completely to present-day mobile telephones.

Also preferred is a method by which, when the speech expression is transmitted, the transmitter adds an identifier to the speech expression. The function of this identifier is to distinguish the speech expression from other speech expressions which do not represent a symbol. For example, when transmitting the symbol "sun" mentioned above, the symbol sun is first converted into the word "sun," and then is provided with an identifier, for example the identifier "#". The speech expression, thus equipped with the identifier "#", is then transmitted by the transmission unit. On the receiving end, this identification of speech expressions makes it possible to distinguish normal speech expressions from speech expressions which encode a symbol. On the receiving end, a preferred embodiment makes it possible to recognize whether or not a speech expression carries the identifier that identifies it as a coded symbol. If the speech expression has no identifier which identifies it as a coded symbol, it is processed on the receiving end as the speech expression per se and is so indicated to the user of the receiving mobile telephone. However, in the case of a speech expression labeled by an identifier, the receiving unit recognizes that this is a coded symbol, and looks for the corresponding associated symbol, preferably in a table stored in a memory. As soon as the symbol has been determined by the receiver, the symbol can be displayed. The user on the receiving end consequently does not notice that only the speech expression was transmitted, but directly sees the symbol and has the feeling that the symbol itself was transmitted.

On the receiving end, too, the method can be implemented by means of a microprocessor, which controls the retrieval of symbol tables and associated speech expressions from the memory, and which likewise controls the receiving unit of the receiver and possibly also the display unit for displaying the symbol which has finally been determined.

In an especially preferred embodiment, a microprocessor executes an algorithm stored in a memory, when it is supposed to convert a symbol into a speech expression. This embodiment consequently does not need a table. This association of a speech expression with a symbol can also be performed on the receiving end when associating a symbol with a speech expression by means of an algorithm. Another embodiment of the invention has the inventive coding only on one side. This means that the symbol is reproduced coded or coded [sic, should be uncoded] only at the receiver or only at the transmitter. This means that, with this embodiment, when the user makes a transmission, only the speech expression is inputted. The user preferably can equip this speech expression with an identifier. Then the identified speech expression is transmitted from the transmitter to the receiver. In this case, only the receiver is then able to convert the identified speech expression into the corresponding symbol. For example, this can be the case if only the receiving mobile telephone is equipped with appropriate display devices which permit display of a symbol, while the transmitting mobile telephone is not able to display a symbol.

In the inverse case, it is possible on the transmitting end to convert the symbol into a speech expression, while this is not possible on the receiving end. In this inverse case, therefore, the selected symbol is converted into a speech expression only on the transmitting end, while only the speech expression is indicated on the receiving end. In the above-mentioned example, the situation would be such that the user of the transmitting mobile telephone selects the symbol sun, then converts the symbol sun, in accordance with the inventive method, into the speech expression "sun" with reference to the association table, and then again transmits this speech expression. On the receiving end, for example if there is no capability of displaying the symbol "sun," this speech expression itself is then displayed.

In another embodiment of the invention, the inventive method and/or the inventive device recognizes the language in which the selected symbol is to be coded prior to coding it. In appropriate circumstances, the user can also prescribe this himself. For example, this means that, if a mobile telephone is owned by a German-speaking user or if the user prescribes German as the transmission language, the symbol "sun" is transmitted as the word "sonne." However, if the user of the mobile telephone speaks English or if the user prescribes the English language, the symbol sun is transmitted as the speech expression "sun." In another embodiment, all important languages in the world are programmed into the memory. The transmitting telephone then transmits in the language set for it, while the receiving telephone, by means of the microprocessor, looks for the language just received in the various tables that are stored in the memory, and then displays the symbol selected by the transmitter.

In another embodiment, the transmitter is a telephone and the receiver is a personal computer (PC) or a fax machine. The transmitted symbol is then displayed by the PC or is printed out by the fax.

The invention further achieves its object by a method with the characteristics cited in claim 29. On the transmission end, at least two related, non-identical symbols are selected, a speech expression is found for each of the two symbols on the transmission end, the speech expressions associated with the symbols are transmitted to the receiver, and, on the receiving end, the sequence of speech expressions is converted into the associated symbols, and the associated symbols are displayed sequentially on a display device. This yields the advantage of enabling a transmitter to easily transmit moving pictures at least to one receiver. The sequence of associated, non-identical symbols preferably correspond to the individual picture sequences of a moving picture, so that moving pictures can be displayed by streaming together at least two of these sequences (symbols). Preferably more than two symbols are selected, and the corresponding speech expressions are joined together, so that picture sequences with correspondingly more sequences can also be transmitted and can be displayed on the receiving end.

A preferred embodiment of the invention specifies that the received symbols (picture sequence) are repeated as a loop on the receiving end, so that, once a transmitted succession of picture sequences has been received, it is displayed on the receiving end continuously as a moving picture—in this case with repeating motions.

A preferred embodiment of the invention specifies that the individual symbols can be retrieved from a stored table on the transmitting end, and that a speech expression associated with the symbols is transmitted. The individual symbols which represent a moving picture naturally differ only slightly. By transmitting picture sequences of a moving picture, the same speech expression preferably is associated with these individual symbols. This speech expression will differ only in a change, addition, or the like which identifies the respective change of the following picture sequence from the preceding one. This reduces to a minimum the complexity of transmitting moving pictures by a succession of picture sequences converted into speech expressions, since the amount of data that needs to be transmitted has been considerably reduced.

On the transmitting end, the received speech expressions are converted into their corresponding associated symbols by means of a table stored in a memory means, and are displayed on the display device.

A preferred embodiment of the invention further specifies that a general identifier is added to a transmitted succession of speech expressions which represent symbols. This identifier identifies the short message (as a consequence of the speech expressions) to the receiver unambiguously as moving picture information. This makes it easily possible to distinguish between normal or other short messages and moving picture information.

The invention further achieves its object by a device with the characteristics specified in Claim. A microprocessor, which interacts with at least one memory means, is associated both with the transmitter and a receiver, of which there is at least one, and in that a prescribable number of symbols with their associated speech expressions is stored in the memory means, and that a display device is present for selecting at least two of the symbols, and that a transmission and reception device is present for transmitting the minimally two symbols. This can advantageously make it simpler to handle the transmission of moving pictures. Simply by retrieving the desired symbols which are stored in a memory means, the microprocessor can automatically control the conversion of the symbols into speech expressions and their processing for transmission. Transmission is thus simplified.

The invention further achieves its object by a method with the characteristics specified in claim 39. On the transmission end, at least two related, non-identical symbols (picture sequences) are selected, on the transmission end a character sequence is found for each of the two symbols, the character sequences associated with the symbols are transmitted to the receiver, and, on the receiving end, the character sequences are converted into their associated symbols, and the symbols are sequentially displayed on a display device, and at the same time a tone sequence associated with the symbols is reproduced acoustically. The advantage here is that a musical background can be actuated at the same time that the moving pictures actuated on the transmitting end are displayed on the receiving end. In this way, either [sic, there is no "or"] the receiver's attention can be called to the transmitted moving pictures, since the musical background is still audible even if the receiver is momentarily not visible. Another advantage here is that the musical background can actuate in the receiver of the moving pictures additional emotions, memories, thoughts, or the like.

A preferred embodiment of the invention specifies that, on the receiving end, at least one tone sequence is permanently associated with the symbols. This makes it possible to limit transmission of information to the symbols, that is the moving pictures, while a tone sequence associated with the symbols is automatically reproduced on the receiving end. This obviates the expense of transmitting the additional reproduction of the tone sequence.

Another preferred embodiment of the invention specifies that the transmitting end can modify the tone sequence reproduced on the receiving end. The advantage of this is that, in addition to transmitting the symbols converted into a sequence of characters, at least one character of the transmitted character sequence can actuate the reproduction of a certain tone sequence on the receiving end. Preferably several possible tone sequences are stored on the receiving end. From these, at least one or possibly a certain series of possible tone sequences can be retrieved through the transmitted character sequence.

The invention further achieves its object by a device with the characteristics cited in claim 46. A microprocessor, which interacts with at least one memory means, is associated both with the transmitter and the receiver, of which there is at least one, and a prescribable number of related, non-identical symbols (picture sequences) together with the associated character sequences, as well as at least one tone sequence associated with the symbols are stored in the memory means, of which there is at least one, and it contains a display device to display the symbols as well as an acoustic reproduction device to reproduce the tone sequences, of which there is at least one, and it has a transmission and reception device for transmitting the character sequences. The advantage here is that moving pictures can be transmitted as well as displayed, coupled with simultaneous reproduction of a tone sequence. Especially because the symbols associated with the transmitted character sequences are stored on the receiving end and because of the tone sequences linked thereby, the transmitting end can very easily actuate reproduction of the moving pictures with their at least single tone sequence. The microprocessors can automatically control the processing of the transmitted symbols and/or tone sequences on the transmitting end as well as reproduction of the symbols and tone sequences on the receiving end. Such devices consequently are easy to handle, and do not require any additional training.

The invention further achieves this object by a method with the characteristics cited in claim 47 and by a device with the characteristics cited in claim 52, in that, on the transmission end, one item of audio information is selected in the form of at least one character representing this item of audio information; the character, of which there is at least one, is transmitted from the transmitter to the receiver; on the receiving end, the character, of which there is at least one, is converted into the item of audio information. The corresponding inventive device is characterized by a memory for storing the characters which represent audio information; a selection means for selecting from the memory an item of audio information in the form of a character, of which there is at least one, which represents this audio information; a transmitter for transmitting the character, of which there is at least one, which represents the audio information. The inventive receiving device correspondingly has a converter to convert the characters representing the audio information into tone signals. In a preferred embodiment, these tone signals are reproduced by a loudspeaker or the like. Another preferred embodiment of the invention is characterized in that the audio information involves at least one tone. By another preferred embodiment, this audio information is then selected by a letter or a note representing this tone. [The German sentence literally reads: "This audio information is then selected in another preferred embodiment of a letter or note representing this tone." However, this does not seem to make sense.] For this purpose, the inventive device stores the audio information—in this embodiment this means the letters or notes forming the audio information—in the memory. They can then be selected from this memory by means of suitable selection means, for example a touch screen or a standard keyboard. This touch screen or keyboard is connected to a microprocessor which actuates the memory. In a preferred embodiment, the characters can then be transmitted from a transmission device to a receiving device. The transmission device preferably has an antenna to transmit electromagnetic waves. The receiving device preferably has a memory, containing a table which associates the characters representing the audio information, in this case the letters or notes, with the corresponding tone signals. According to the invention, these tone signals, assigned by a microprocessor on the receiving end, can then be reproduced as a tone signal by a loudspeaker or the like.

Another preferred embodiment has a memory in which are stored entire melodies on the transmitting end and/or on the receiving end. These melodies likewise can be selected on the transmitting end by means of characters representing these melodies, and can be transmitted to the receiver by transmitting the characters representing the corresponding melody. By means of an identical table, which likewise can be stored in a memory, the receiver can then retrieve and/or reproduce the corresponding memories on the basis of the received character.

The inventive method and the inventive devices can be used especially advantageously in a mobile telephone, a so-called handy, for transmitting audio information from a transmitter and receiving it by a receiver. In such mobile telephones, a character representing a tone signal or a memory is then selected from the memory through the keyboard, and is transmitted by pressing the appropriate key. The receiving handy then has a corresponding table for converting the transmitted character, which represents audio information, into the audio information which it represents, i.e. for example, a tone signal or a melody. By means of a microprocessor present in the receiving handy, the melody, which has been retrieved by means of the corresponding table, can then be reproduced through the loudspeaker of the handy either automatically or as desired by the user. By means of this invention, small musical pieces or the like can thus be sent as a greeting by mobile telephones, without the transmission time being extended beyond the fee.

The invention is used especially advantageously in combination with the familiar SMS message. In this way, it is possible, for example by appending an appropriate identifier to normal letters, to identify these letters as coded tones. On the receiving end, for example in a receiving handy, the SMS message with its attached special identifier can thus be recognized as actually representing a tone signal. [The German actually says: "On the receiving end, for example in a receiving handy of such an SMS message equipped with a special identifier, it can be recognized that actually a tone signal is involved." However, this does not seem to make sense.] If the receiving handy is properly equipped, so as to recognize the identifier and converting the so-identified letter into a tone signal, the corresponding tone signal can then be reproduced on the receiving end through the loudspeaker of the receiving handy, after it has received this novel SMS message. The invention further achieves this object by a method with the characteristics cited in claim 56. On the transmission end, at least one game is actuated from a prescribable number of different games, the actuated game is displayed on a display device of the transmitter by an associated game mask, an operator selects a desired game action, the desired game action is transmitted from the transmitter to the receiver, on the receiving end, the game action desired on the transmission end is displayed on a display device of the receiver by actuating a game mask associated with the game, and that the game action desired on the transmission end is visualized on the game mask. The advantage here is that games can be played with at least two players even over arbitrarily great distances. This opens up completely new fields of application. Furthermore, the inclusion of several players enhances the entertainment value. A preferred embodiment of the invention specifies that the desired game action is entered on the transmission end through an operating device which preferably is an alphanumeric keyboard, and is transmitted to the receiver [the German says: "transmitter," however, this makes no sense] as a short message. This reduces to a minimum the amount of data that must be transmitted to play the game.

Further, a preferred embodiment of the invention specifies that an identifier is added to a transmitted game action so as to identify the short message to the receiver unambiguously as a game action. This makes it very simple to distinguish between standard short messages and/or other ones on the one hand, and game information on the other hand.

Another preferred embodiment of the invention specifies that, on the transmitting end, your wish to play a game is transmitted to a forwarding exchange associated with a service central, and this forwarding exchange forwards this wish to at least one receiver from an available pool of receivers willing to play. [The German says: "This forwarding exchange forwards at least one receiver from an available pool of receivers willing to play, to take up the game." However, this makes no sense]. This enables an operator on the transmitting end to express a wish to play, at any time and independent of any known partner, and to start the game with at least one partner, assigned through the forwarding exchange.

Preferably it can also be specified that the forwarding exchange selects as receiver a game computer, for example a chess computer. This enables a sender to start a game even with the game computer, if no normal receiver is ready to play just then.

Further, a preferred embodiment of the invention specifies that the forwarding exchange associated with the service provider connects simultaneously to several receivers, so that games with more than two players are possible in the manner of a conference call. In this case, depending on the nature of the activated game, either each player can play against each other player, for example in the game "Pachisi®," or one player alone can play against several players, for example simultaneous chess.

The invention further achieves its object by a device with the characteristics cited in claim 65. Both the transmitter and the receiver have a microprocessor which is connected to a memory means, in which is stored the game mask of at least one game. The advantage of this is that the microprocessor can retrieve the game mask of at least one game, and it can be displayed on the display device of the transmitter. At the same time, when a game mask is displayed on the display device, the microprocessor can switch the alphanumeric operating device of the transmitter to "game operation," which simplifies transmission of the desired game actions. At the same time, the completed game actions and the completed game reactions of the opposing player can be stored in the memory means, so that a running game can be interrupted at any time without the previous game actions being lost. In this way, a game between at least two partners can also last over an extended time, for example days, weeks, months, or the like. The memory means is designed that its content is not lost even if its power supply is interrupted.

Another preferred embodiment of the invention specifies that a game mask of at least one game, from the memory means of the transmitter, is transmitted to the receiver upon request. The advantage of this is that a game can be carried on even with a receiver whose receiving device does not have available the necessary game mask to play the game.

Further preferred embodiments of the invention derive from other features cited in the subclaims.

BRIEF DESCRIPTION OF THE DRAWINGS

The invention is explained in more detail below by way of embodiments, with reference to the associated drawings.

FIGS. 30 to 35 schematically show various possibilities for transmitting moving pictures.

DETAILED DESCRIPTION OF THE PREFERRED EMBODIMENTS

Figure 1:
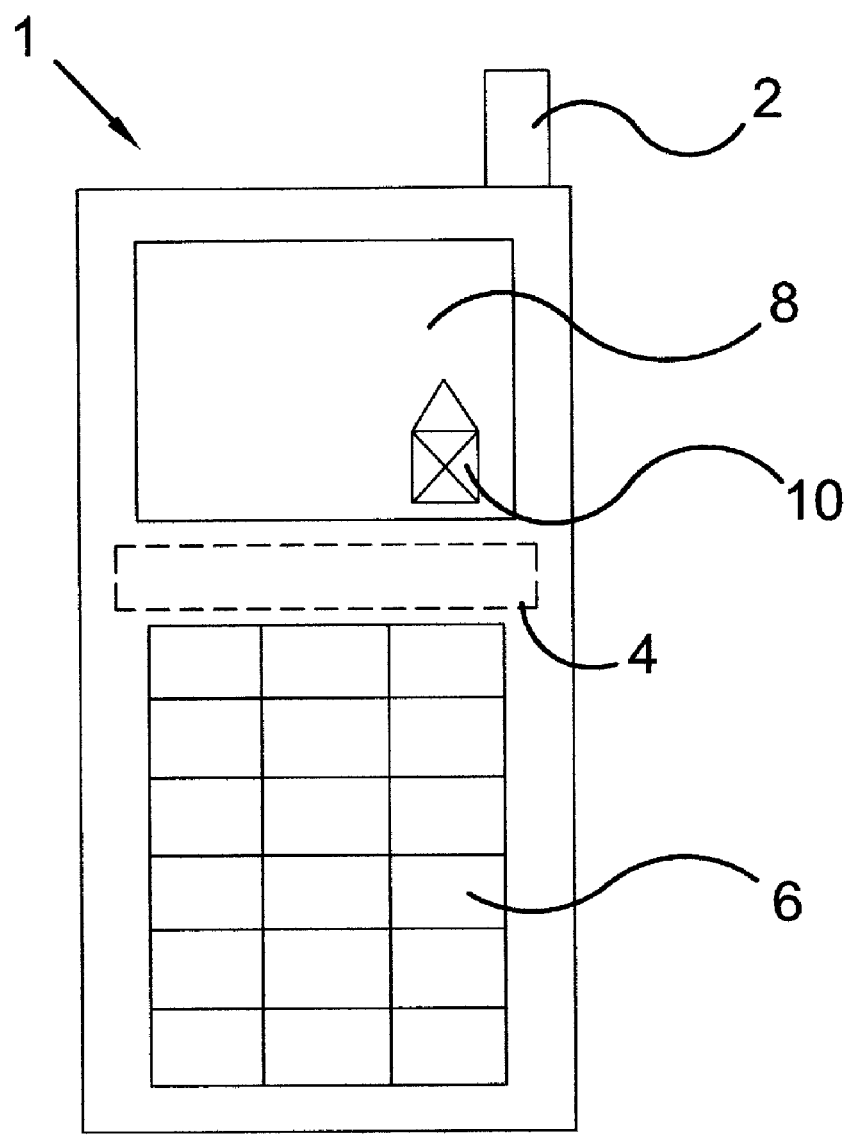
FIG. 1 schematically shows an inventive mobile telephone for transmitting, coding, and/or receiving symbols.
Figure 2:
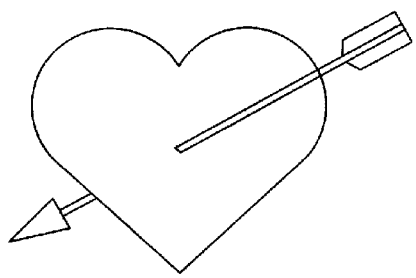
FIGS. 2 to 26 show various symbols that can be transmitted by the inventive method.
Figure 3:
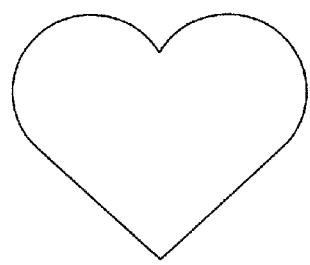
Figure 4:
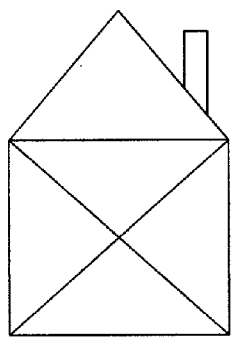
Figure 5:
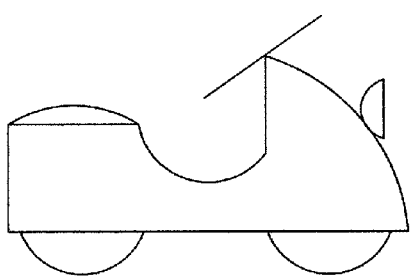
Figure 6:
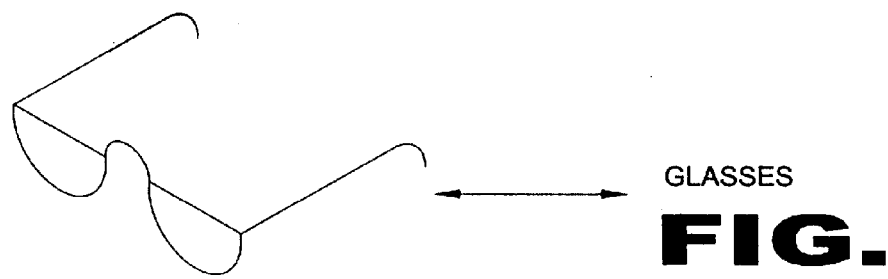
Figure 7:
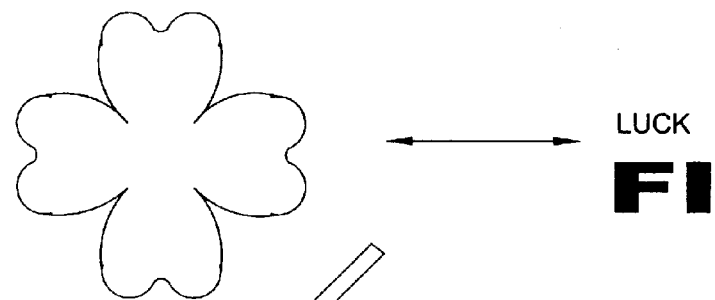
Figure 8:
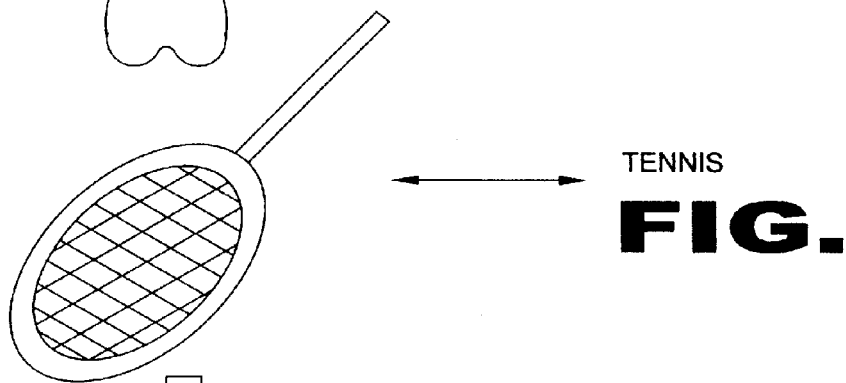
Figure 9:
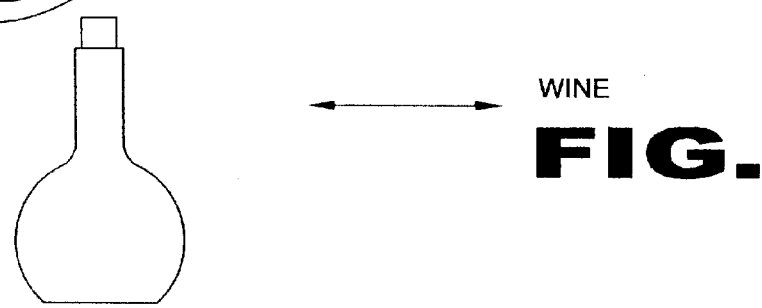
Figure 10:
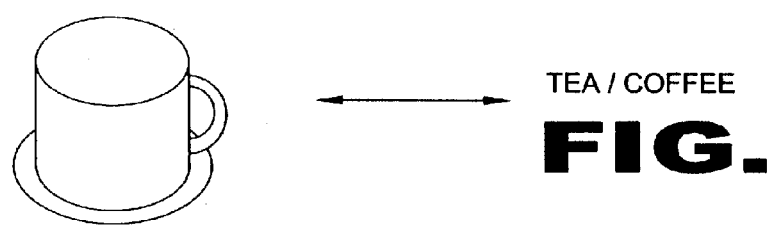
Figure 11:
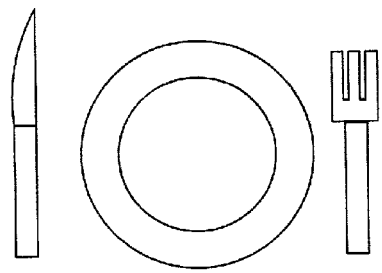
Figure 12:
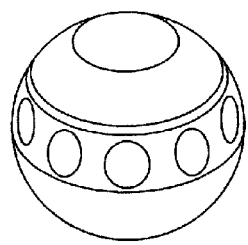
Figure 13:
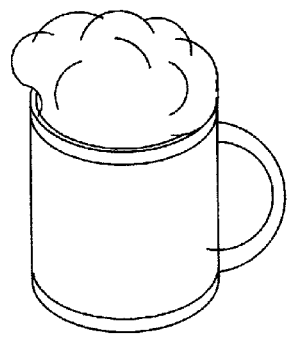
Figure 14:
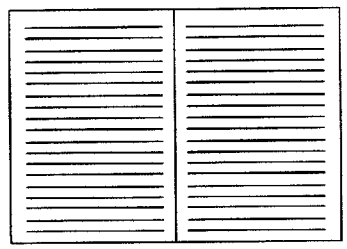
Figure 15:
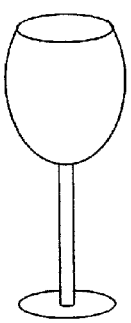
Figure 16:
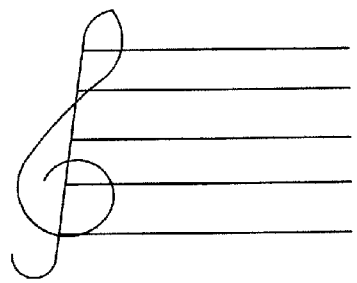
Figure 17:
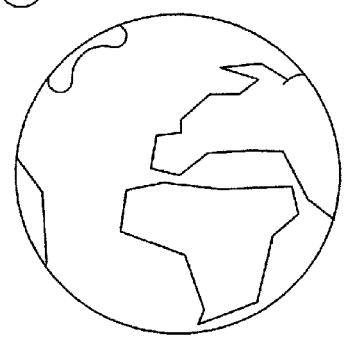
Figure 18:
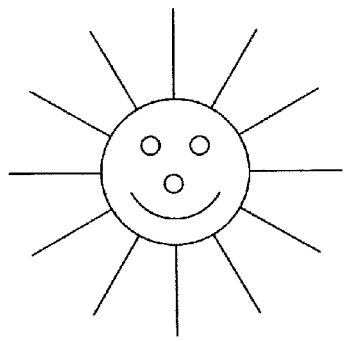
Figure 19:
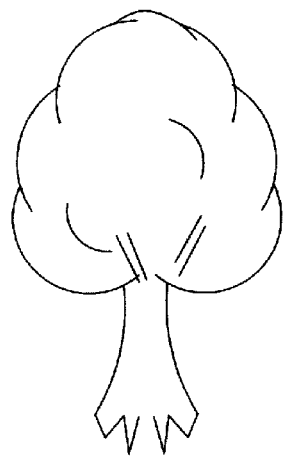
Figure 20:
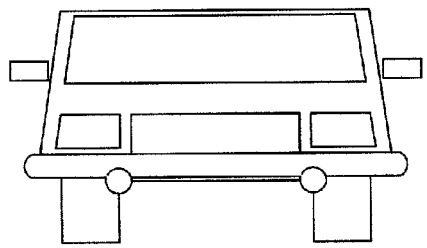
Figure 21:
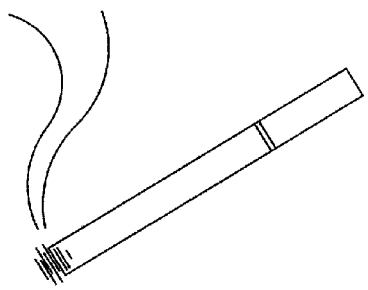
Figure 22:
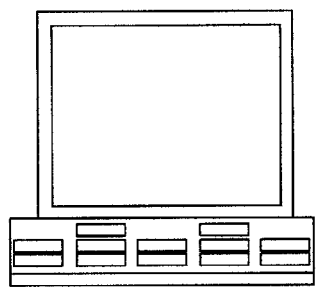
Figure 23:
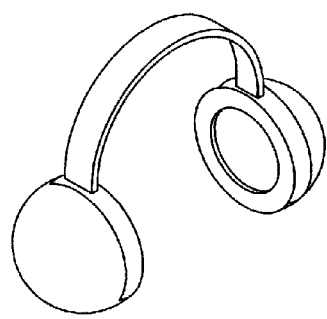
Figure 24:
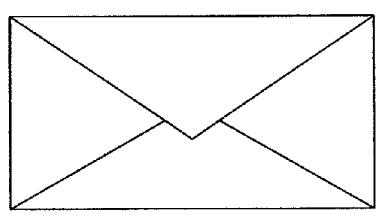
Figure 25:
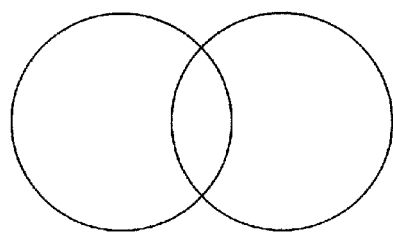
Figure 26:
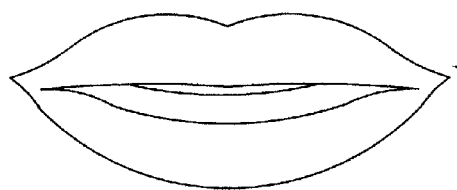

FIG. 1 shows a mobile telephone 1. The mobile telephone 1 has a transmitting unit, which is not shown, with an antenna 2. The antenna serves both as transmitting antenna for the transmission unit and as a receiving antenna for the reception unit, which likewise is not shown.

Further, the mobile telephone 1 has a battery, which is not shown, a microprocessor which is not shown, and a schematically represented memory 4. The battery supplies the mobile telephone 1 with power. The microprocessor is used to control the mobile telephone 1 and its components.

Further, the mobile telephone 1 has a keyboard 6 as input unit. By means of the keyboard 6, the microprocessor can be actuated in such a way that a symbol selected through the keyboard 6 is retrieved by the microprocessor from the memory 4 and is displayed on a display 8. In the example shown in FIG. 1, the display 8 of the mobile telephone 1 shows a house as symbol 10. The display 8 is a liquid crystal display. However, a person skilled in the art will be familiar with other types of display. Through the keyboard 6, the user can now enter the instruction to the microprocessor, that the displayed symbol 10 is to be sent from the mobile telephone 1, by means of the transmission unit and the transmission antenna 2, to another mobile telephone, which is not shown. For this purpose, under the control of the microprocessor, the symbol 10, in this case a house, is then automatically translated, by means of a translation table stored in the memory 4, into the speech expression "house." Then an identifier, for example the character "#", is added to the expression "house." Then again, under the control of the microprocessor, the resulting expression "house#" is transferred to the transmission unit. By means of the transmission antenna 2, the transmission unit then transmits the term "house#" to the other mobile telephone.

The reception unit of the other mobile telephone receives the term "house#" by means of a receiving antenna. The received term "house#" is forwarded by the reception unit to a microprocessor and, under the control of the microprocessor, it is associated with a particular symbol by means of a table stored in the other mobile telephone, and the symbol found in this way is displayed on a display device of the other mobile telephone. The user of the other mobile telephone thus feels that he has received the transmission of the symbol "house."

FIGS. 2 to 26 show examples of symbols that can be transmitted by means of the inventive method. On the left side of the figures are shown the symbols that can be selected and transmitted, while on the right side are shown the respectively associated speech expressions. For example, one of the tables mentioned above contains all the symbols shown in the figures and their corresponding associated expressions. Before being transmitted, the particular symbol is translated into the expression.

Figure 27:
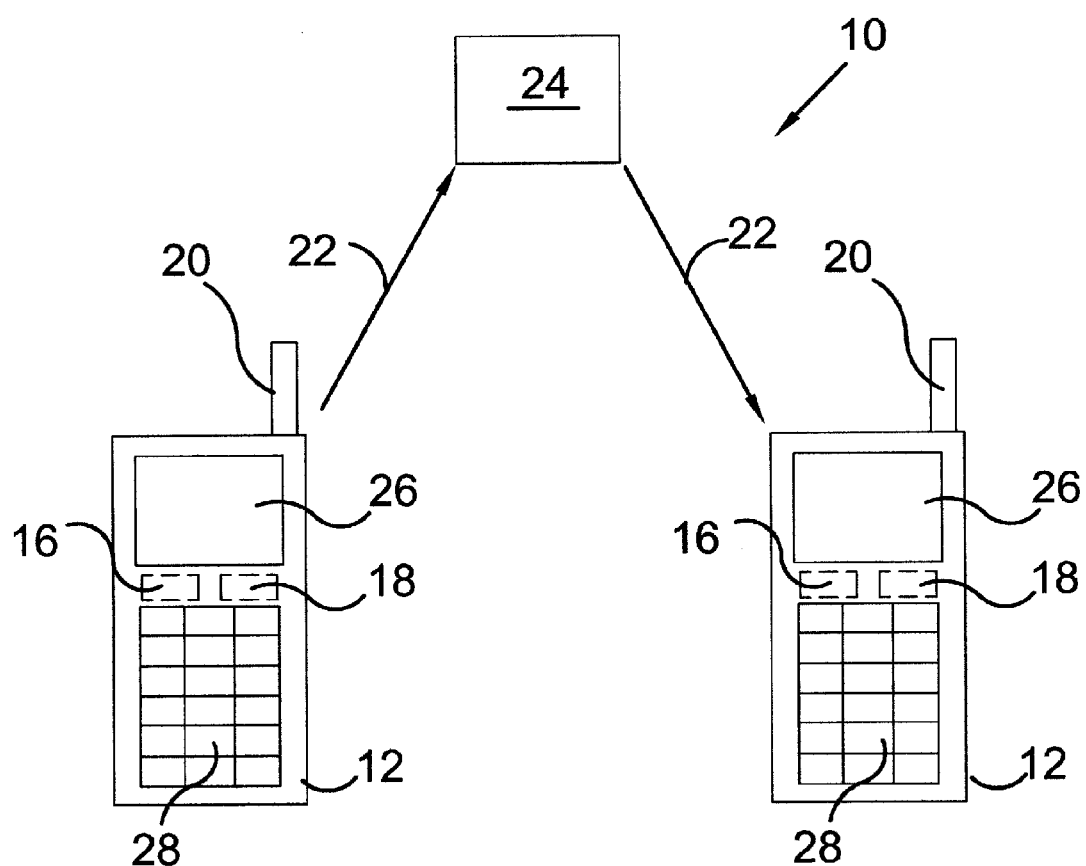
FIG. 27 schematically shows a view of a transmitter and/or receiver for transmitting information.

FIG. 27 schematically shows an arrangement 10 for transmitting moving pictures from a transmitter 12 to a receiver 14. The transmitter 12 and/or receiver 14 can be, for example, mobile telephones, PCs, fax machines, communicators, laptops, notebooks, or the like. Terminal devices (telephones), which have an appropriate display (still to be explained), and which are connected to telecommunication systems, are also conceivable. The embodiments discussed below assume that the transmitter 12 and the receiver 14 each represent a mobile telephone. However, their functions can be transferred to the other devices named above, and are within the scope of protection of the invention.

First it is assumed that an operator of the transmitter 12 wishes to send moving picture information to a person owning the receiver 14. For this purpose, the operator of the transmitter 12 retrieves—in a manner to be explained later—a succession of picture sequences (later also called symbols) from a memory means 16. In a time-ordered representation, these yield a moving picture. This succession of at least two associated, non-identical symbols is processed by a microprocessor 18 and is transmitted, through a transmission and reception device 20, as a short message 22, to a service provider 24. The service providers 24 are, for example, operators of mobile broadcasting systems, such as, for example, C-networks, D-networks, E-networks, or the like. The transmission of a short message 22 via a service provider 24 to a chosen receiver 14 is generally known, so that this does not need to be discussed within the framework of the present description.

The short message 22, which represents the succession of picture sequences, is transmitted to the receiver 14 by way of the service provider 24. The receiver 14 recognizes—likewise in a manner still to be explained—that the short message 22 represent moving pictures. When the receiver 14 retrieves the short message 22, which does not necessarily have to happen immediately but can also happen at a later time, the receiver 14 recognizes the picture succession by means of a microprocessor 18, which interacts with a memory means 16. The appropriate number of picture sequences is then shown, in a sequential plan order, on a display device 26, so that a moving picture is created for the viewer.

Figure 28:
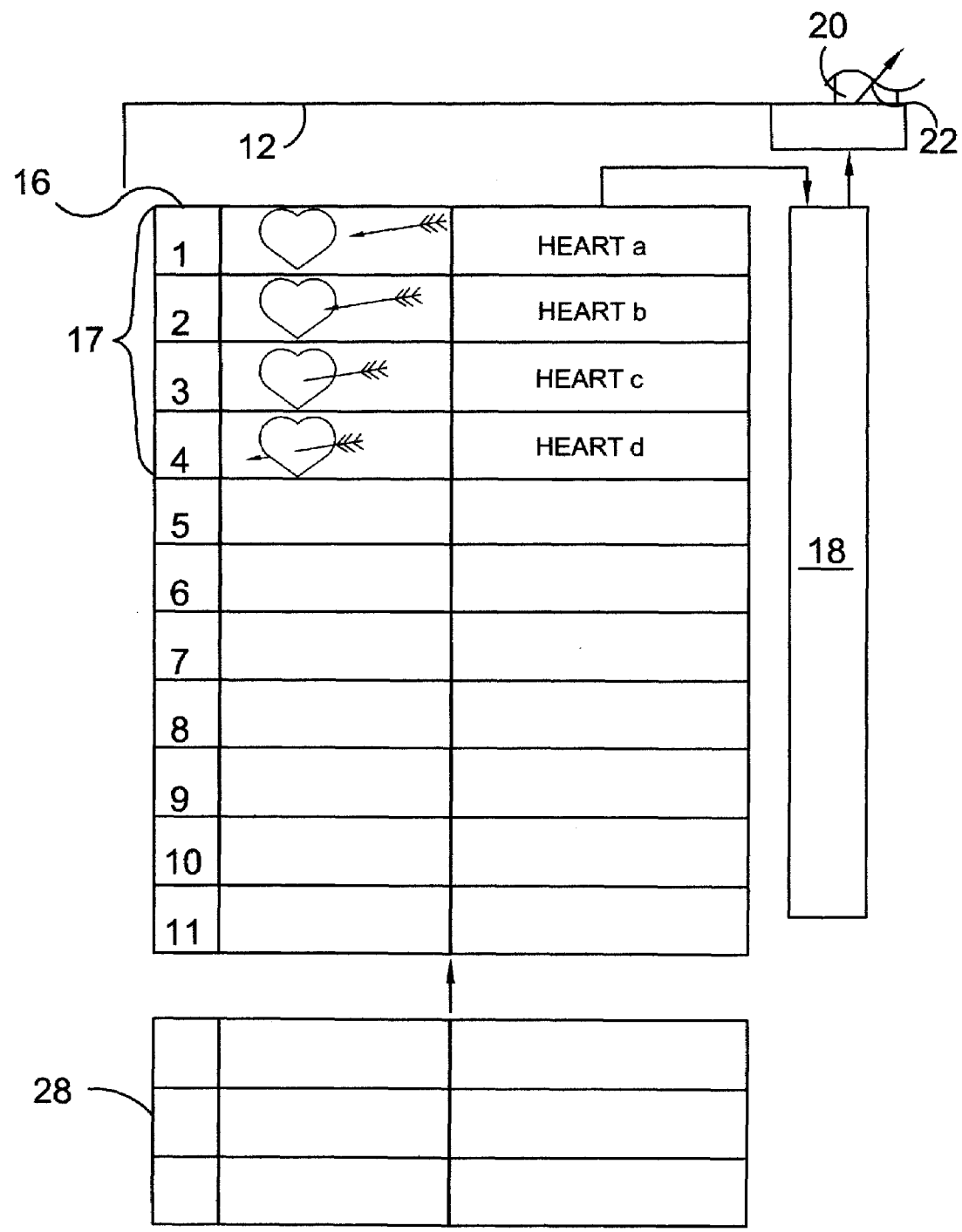
FIG. 28 shows a block circuit diagram for transmitting moving pictures.

FIG. 28 shows a schematic block circuit diagram to elucidate the transmission of moving pictures. The same parts as in FIG. 27 carry the same reference symbols and will not be discussed again. The available modes of transmitting moving pictures can be represented on the display device 26 through an operating device 28, which, for example, can be formed by an alphanumeric keyboard. This representation can be menu-guided, for example, in that pressing appropriate keys on the operating device 28 causes the available modes to be shown individually, successively, or combined. In the embodiment under discussion, it is assumed that an arrow approaching a heart is to be transmitted as the moving picture. By way of example, this moving picture is decomposed into four picture sequences, which are stored in the storage means 16 under the ordinal numbers "1," "2," and "4." The individual picture sequences, viewed by themselves individually, each represent a phase of the arrow's approach to the heart. A speech expression is associated with each of the picture sequences, which quasi correspond to a picture symbol. By way of example, this association is stored in the storage means 16 in the schematically shown tabular form. For example, the speech expression "hearta" is associated with the picture sequence "1." The speech expression "heartb" is associated with the picture sequence "2," the speech expression "heartc" with the picture sequence "3," and the speech expression "heartd" with the picture sequence "4." If this arrow, approaching the heart, is to be transmitted as a moving picture, from the transmitter 12 to the receiver 14, the microprocessor 18 controls the transmission and reception unit 20 in such a way that the sequence "heartaheartbheartcheartd" is transmitted as a short message.

On the receiving end, its transmission and reception device 20 transfers this short message to the local microprocessor 18. By reading the memory means 16, which is likewise present there, the microprocessor 18 finds the associated picture symbol (picture sequence). Actuating the display device 26 at the receiver 14 can cause the picture sequences "1," "2," "3," and "4" to be displayed in temporal succession. For the viewer of the display device 20 on the receiving end, this yields, as the moving picture, the arrow approaching the heart.

To simplify transmission, one can make an arrangement such that, when the ordinal number "1" is selected in the transmitter 12, all picture sequences belonging to a block 17, for example the picture sequences with ordinal numbers "1," "2," "3," and "4," are retrieved and are transmitted to the receiver 14.

To reduce the transmitted data still further, the invention specifies that, when the ordinal numbers "1," "2," "3," and "4," are invoked, the microprocessor 18 automatically recognizes that four successive, associated (belonging to one block 17), only slightly different picture symbols (picture sequences) are to be transmitted. On this basis, an abbreviated short message can be formed in such a way that the short message merely reads "heartabcd." The short message thus consists of a route "heart," which characterizes the entire picture sequence, and the associations "abcd," which correspond to the individual picture sequences. This transmitted short message 22 clearly requires less data than the succession of individual picture sequences with their complete speech expressions, as discussed above. The microprocessor 18 at the receiving end then correspondingly re-converts the message and causes their pictures to be displayed on the display device 26.

To identify the short message 22 for the receiver as a transmission of associated picture sequences, an identifier can be added, for example by the "#" key. The short message will then consist of the character sequence of variant 1, "heartaheartbheartcheartd#" or of the preferred short variant 2 "heartabcd#."

Of course, the transmitter 12 can also select only individual picture sequences, for example two, from a block of associated picture sequences. These are then transmitted as a short message. For example, the ordinal numbers "2" and "4" can be selected from the block of ordinal numbers "1," "2," "3," and "4." In this case, either "heartbheartd#" or "heartbd#" is transmitted as the short message. Corresponding to the actually available number of associated picture sequences, various different possibilities result for transmitting moving pictures consisting of several individual picture sequences.

FIG. 29 again schematically elucidates reception of the short message 22 at the receiver 14. Through the transmission and reception device 20, the microprocessor 18 obtains the short message 22, and transmits this to the memory unit 16. The speech expressions are uniquely associated with the picture sequences, and thus the time progression of the individual picture sequences can be displayed on the display device 26, corresponding to the received short message 22. In the chosen example, the "heart," as a constant, identical picture component, needs to be displayed only once, while the approaching "error" is alternatively displayed in its four flight phases, corresponding to the ordinal numbers "1," "2," "3," and "4," which were prescribed at the transmission end.

Figure 29:
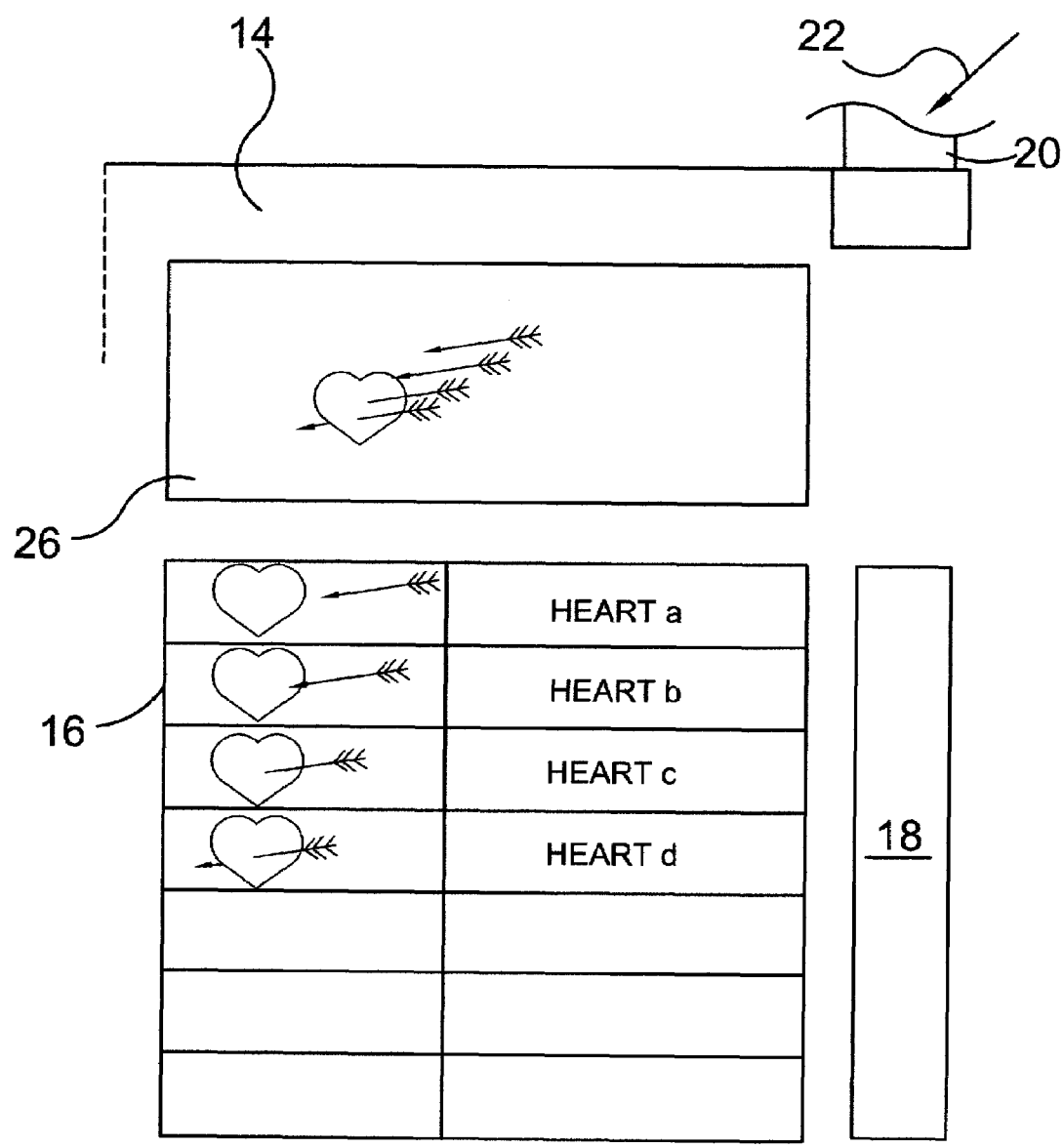
FIG. 29 shows a block circuit diagram for receiving moving pictures.

The four flight phases of the arrow, which naturally are displayed one after the other, are schematically indicated on the display device 26 in FIG. 29. A viewer of the display device 26 consequently sees an arrow approaching the heart. The microprocessor circuit 18 can have an appropriate loop circuit, by which the symbols which were transmitted as the short message 22 and which were converted, via the memory unit 16, into the picture sequences, can be displayed repetitively. This can continue until an operator at the receiver 14 interrupts or terminates the moving picture information.

The short message 22 can be retrieved and thus the moving pictures can be displayed either immediately after the short message 22 has been received or also later. For this purpose, there is a facility for intermediate storage, until the operator of the receiver 14 retrieves the short message 22.

FIGS. 30 to 35 show further embodiments, which relate to various picture sequences for transmitting moving pictures. The storage means 16 is always shown schematically, such that associated picture sequences are always shown in a block 17 with the associated ordinal numbers. As regards the retrieval and transmission of the picture sequences shown in FIGS. 30 and 35 by way of example, reference is made to the description of FIGS. 27 to 29.

According to FIG. 30, it can be specified that a moving picture consists of a point gradually enlarging into a heart. The individual picture sequences designated by the ordinal numbers "5," "6," "7," "8," and "9" can be associated with the speech expressions "pointa," "pointb," "pointc," "pointd," and "pointe." The transmission can then again consist either of a succession of the speech expressions, for example "pointapointbpointcpointdpointe#" or, according to the short variant, "pointabcde#."

FIG. 31 shows, as an embodiment, an approaching pair, which consists altogether of four picture sequences designated by the ordinal numbers "10," "11," "12," "13."

Figure 32:
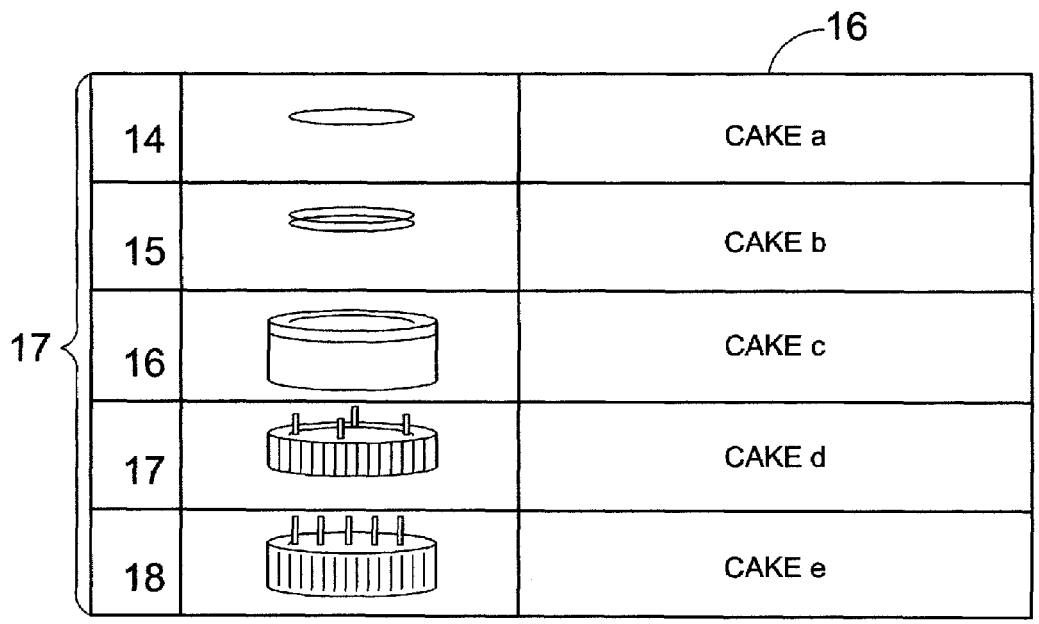
Figure 32:
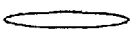
Figure 32:
Figure 32:
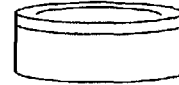
Figure 32:
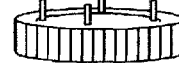

FIG. 32 shows a possible presentation of a birthday cake, with the picture sequences designated by the ordinal numbers "14," "15," "16," "17," "18." A quasi growing cake, which finally receives burning candles, can be displayed here.

Figure 33:
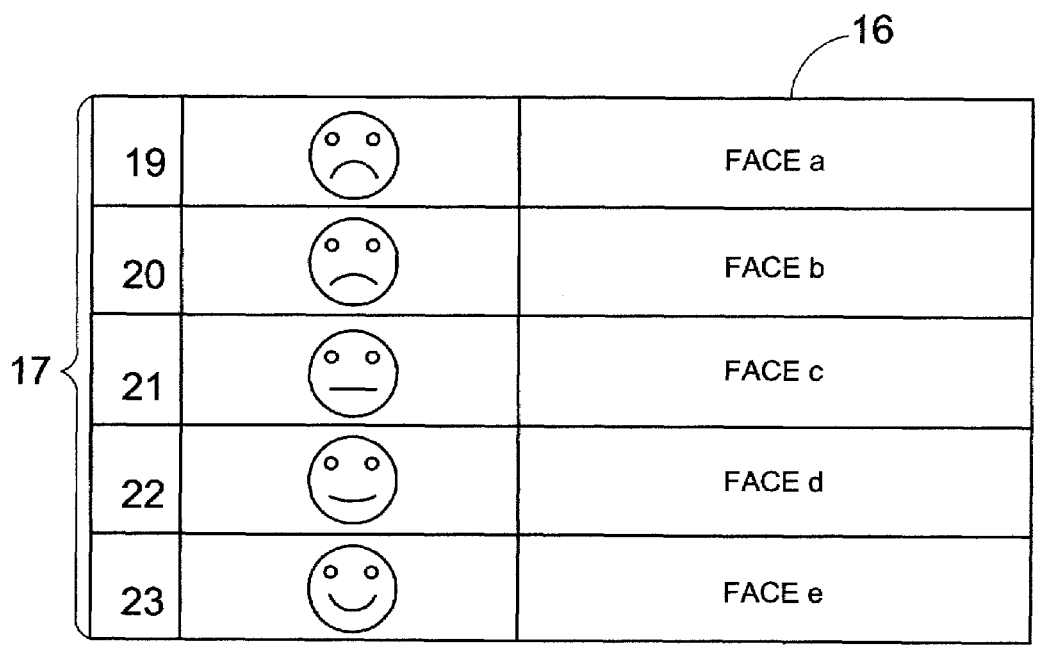
Figure 33:
Figure 33:
Figure 33:
Figure 33:

FIG. 33 shows how a face can be displayed, whose features can change from crying to laughing or vice versa. The individual picture sequences here carry the ordinal numbers "19," "20," "21," "22," "23".

Figure 34:
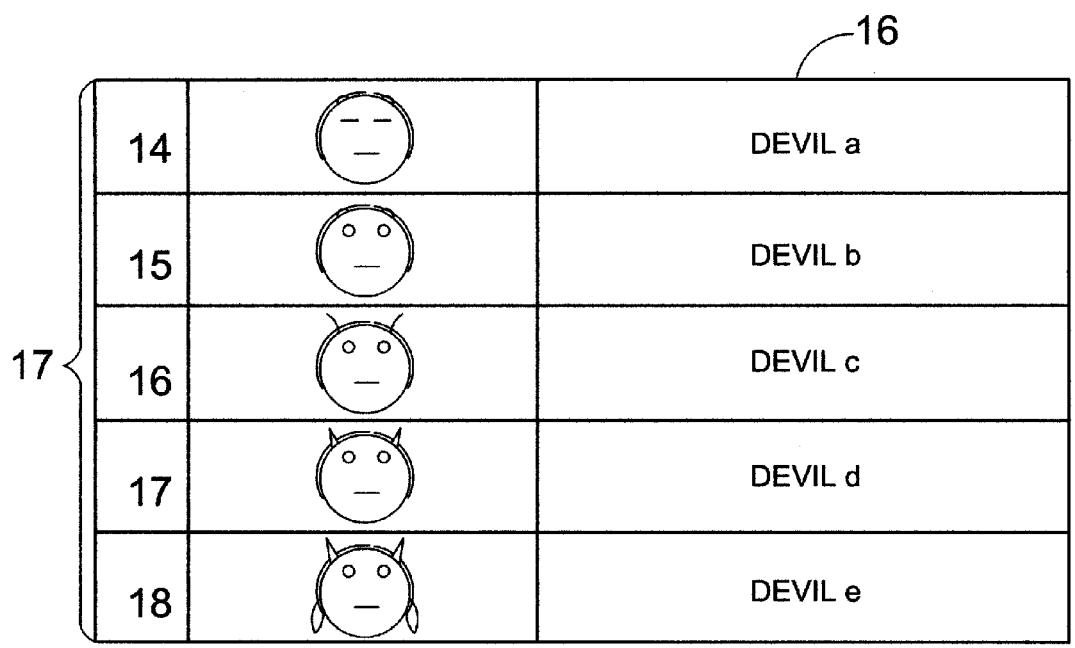
Figure 34:
Figure 34:
Figure 34:
Figure 34:

According to FIG. 34, a picture sequence which changes from a face to a devil can be associated with the ordinal numbers "24," "25," "26," "27," and "28".

Figure 35:
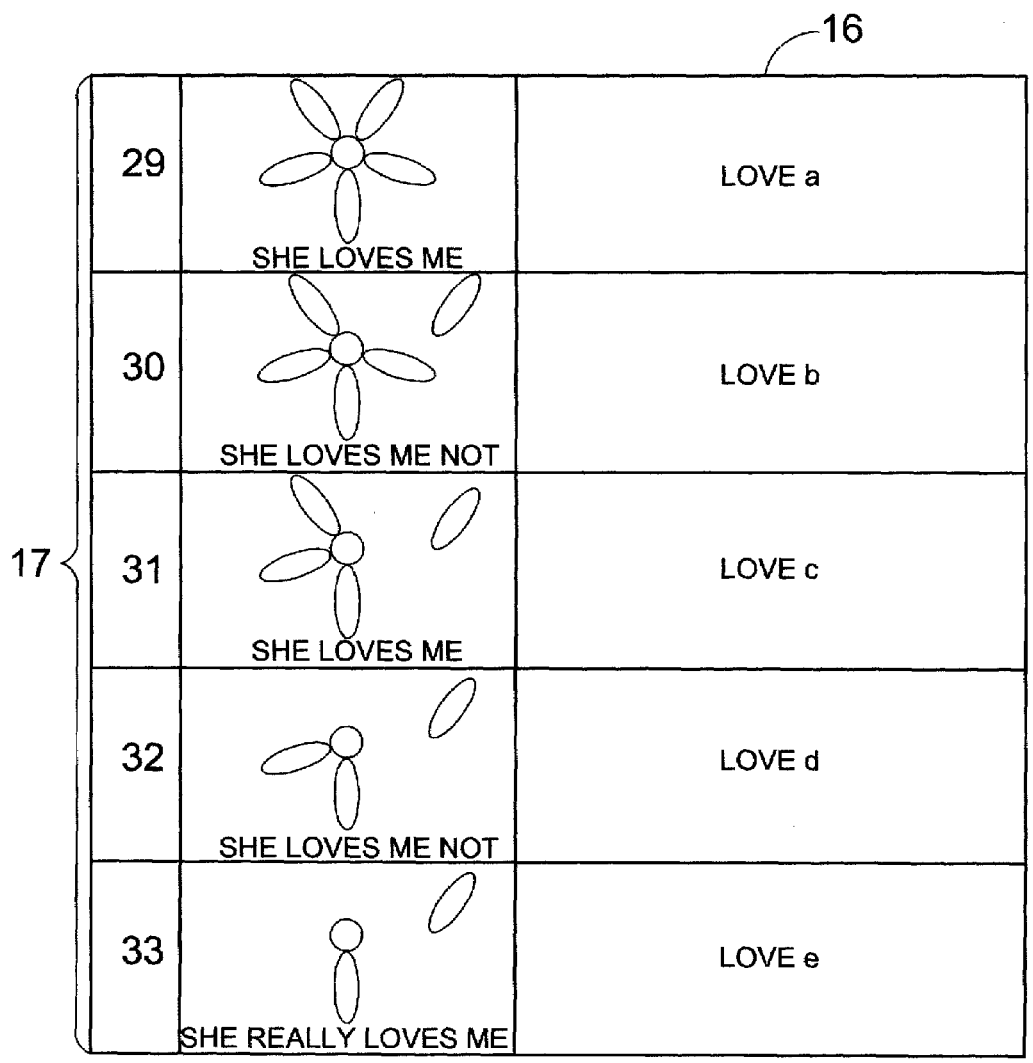

Finally, FIG. 35 shows how a flower can be displayed, which always loses a petal in the individual picture sequences and which, according to the familiar "flirt game," can carry the subtext "he/she loves me," "he/she loves me not" and "he/she does love me."

According to further embodiments, the moving pictures can consist, for example, of a laughing and/or crying sun, or a house with a smoking chimney. These can be transmitted and received in moving representations comprising several, but at least two, picture sequences. This enumeration is not complete and final, of course. Any conceivable picture representation, especially if it can be represented in schematized form, can be transmitted as a moving picture in accordance with the method discussed here.

Figure 36:
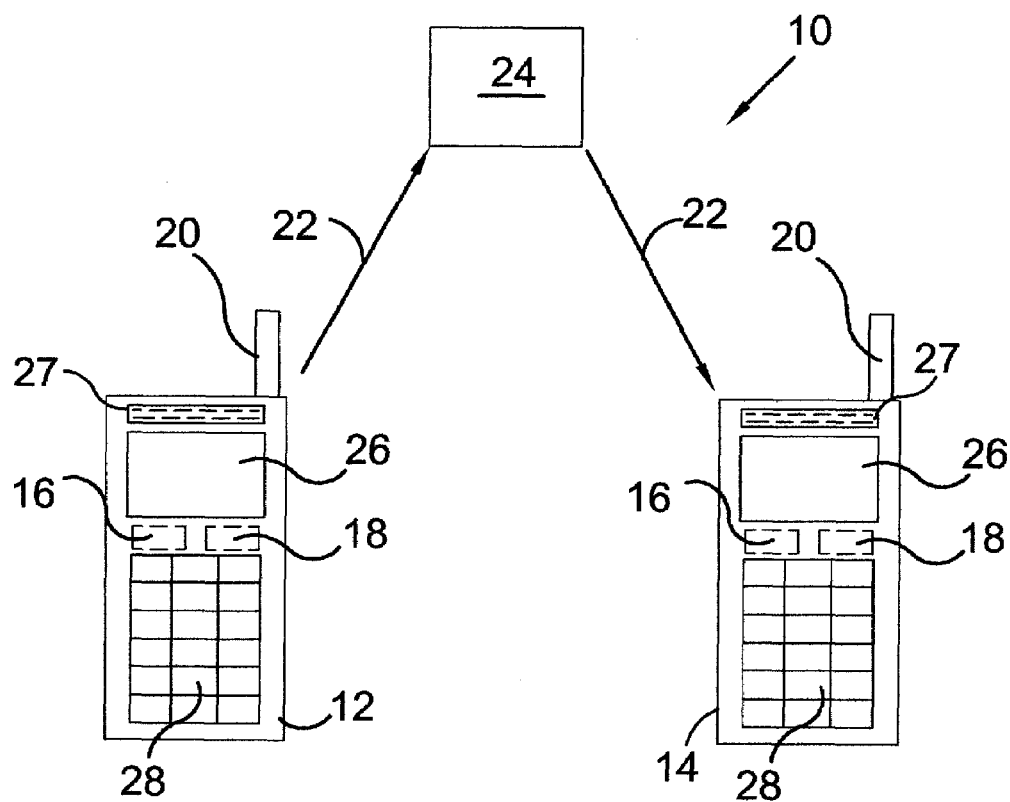
FIG. 36 schematically shows a view of a transmitter and of a receiver for transmitting information.

FIG. 36 schematically shows an arrangement 10 for transmitting moving pictures with a musical background, from a transmitter 12 to a receiver 14. For example, a transmitter 12 and/or receiver 14 can be mobile telephones, PCs, fax machines, communicators, laptops, notebooks, or the like. Terminal devices (telephones), which are connected to telecommunication systems, and which are appropriately equipped, are also conceivable. The following embodiment assumes that the transmitter 12 and the receiver 14 are each a mobile telephone. However, their functions can readily be transferred to the other devices mentioned above, and are included within the scope of protection of the invention.

The starting point here is that an operator of the transmitter 12 wishes to send moving picture information with a musical background to the owner of the receiver 14. The operator of the transmitter 12 for this purpose—in a manner to be explained later—retrieves from a memory means 16 a succession of picture sequences (later also called symbols), which yield a moving picture when they are displayed in temporal succession. In addition, information can be but need not be invoked, which causes the receiver not only to display the moving pictures but also to reproduce at least one tone sequence.

On the transmission end, the sequence of at least two associated, non-identical symbols, and possibly the triggering information of the tone sequence which is to be reproduced, are transmitted as a short message 22, via a transmission and reception device 20, to a service provider 24. Service providers 24 are, for example, operators of mobile broadcast systems, such as example C-networks, D-networks, E-networks, or the like. The transmission of a short message 22, via a service provider 24, to a selected receiver 14, is generally known. Consequently, this needs not be discussed in more detail within the framework of the present description.

The short message 22, which represents the succession of picture sequences and, in some circumstances, the triggering information for reproducing the tone sequence, is transmitted, via the service provider 24, to the receiver 14. In a manner which likewise must still be explained, the receiver 14 recognizes that the short message 22 relates to the display of moving pictures with a musical background. The receiver 14 can invoke the short messages 22 either immediately or also at a later time. The receiver 14 then recognizes the picture sequence and, by means of a likewise available microprocessor 18, which interacts with a storage means 16, the corresponding number of picture sequences is displayed in temporal succession on the display device 26, resulting in a moving picture for the viewer. At the same time, the tone sequence associated with the moving pictures is reproduced on a loudspeaker 27 as a melody, in some circumstances with a song.

Figure 37:
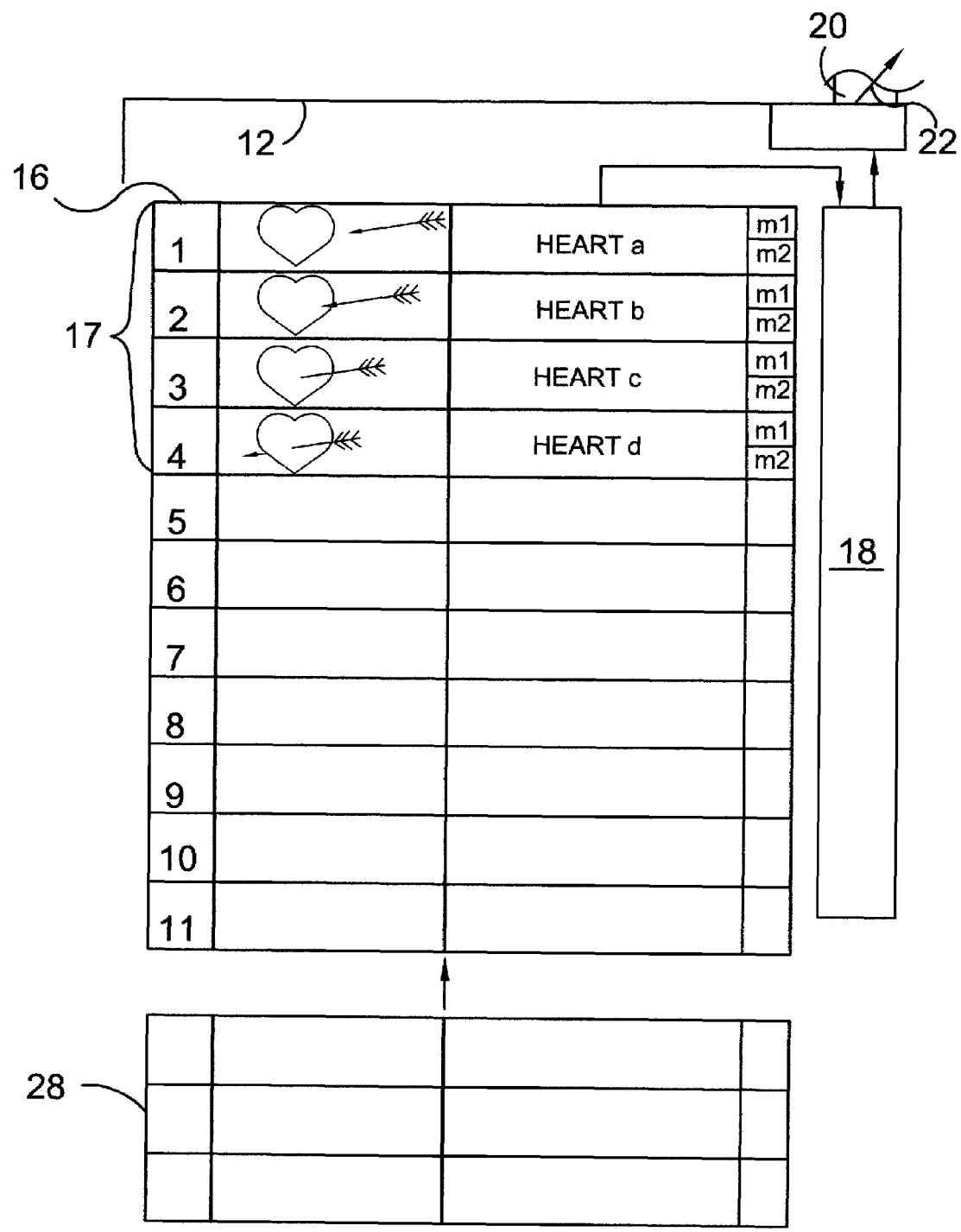
FIG. 37 shows a block circuit diagram for transmitting moving pictures with tone sequences.

In a schematic block circuit representation, FIG. 37 elucidates the transmission of moving pictures with a musical background. The same parts as in FIG. 36 carry the same reference symbols and will not be discussed again. The available modes for transmitting moving pictures with a musical background can be displayed on the display device 26 through an operating device 28 which, for example, can be formed by an alphanumeric keyboard. For example, this presentation can be menu-guided, in that pressing appropriate keys on the operating device 28, the available modes are displayed individually, successively, or combined. In the embodiment under discussion, it is assumed that an arrow approaching a heart is to be transmitted as the moving picture. By way of example, this moving picture is decomposed into four picture sequences, which are stored in the storage means 16 under the ordinal numbers "1," "2," "3," and "4." The individual picture sequences, viewed by themselves individually, each represent a phase of the arrow's approach to the heart. A speech expression is associated with each of the picture sequences, which quasi corresponding to a picture symbol. By way of example, this association is stored in the storage means 16 in the schematically shown tabular form. For example, the speech expression "hearta" is associated with the picture sequence "1." The speech expression "heartb" is associated with the picture sequence "2," the speech expression "heartc" with the picture sequence "3," and the speech expression "heartd" with the picture sequence "4."

The storage means 16 furthermore associates the tone sequences (music) which form the background to the pictorial representations. For example, a choice of two possible tone sequences "m1" and "m2" is here associated with each picture sequence. Each of these abbreviations "m1" and "m2" triggers the reproduction of a certain associated tone sequence at the receiver together with transmission of the moving pictures—as will be discussed below. According to the example shown here, the tone sequence "m1" or "m2" can be chosen. According to other embodiments, only one tone sequence "m" or a plurality of tone sequences "m1" to "mx" can be associated with each picture sequence or with each block 17 of associated picture sequences.

If this arrow, approaching the heart, is to be transmitted as a moving picture, from the transmitter 12 to the receiver 14, the microprocessor 18 controls the transmission and reception unit 20 in such a way that the sequence "heartaheartbheartcheartd" is transmitted as a short message.

On the receiving end, its transmission and reception device 20 transfers this short message to the local microprocessor 18. By reading the memory means 16, which is likewise present there, the microprocessor 18 finds the associated picture symbols (picture sequences) and the associated tone sequence. Actuating the display device 26 at the receiver 14 can cause the picture sequences "1," "2," "3," and "4" to be displayed in temporal succession and simultaneously the tone sequence (music) corresponding to the character sequence "m1" can be played. For the viewer of the display device 20 on the receiving end, this yields, as the moving picture, the arrow approaching the heart and at the same time the audio reception of the associated melody. The melody as such can consist of an arbitrary tone sequence, which has been previously specified and which is stored in the memory means 16 of the receiver. The tone sequences here can be simple successive tones, complex melodies, and/or melodies combined with song. As a specific example, for example, the "Wedding March" can be intoned as the melody when displaying the arrow approaching the heart.

To simplify transmission, one can make an arrangement such that, when the ordinal number "1" is selected in the transmitter 12, all picture sequences belonging to a block 17, for example the picture sequences with ordinal numbers "1," "2," "3," and "4," as well as an associated tone sequence, for example the tone sequence "m1", are retrieved and are transmitted to the receiver 14.

To reduce the transmitted data still further, the invention specifies that, when the ordinal numbers "1," "2," "3," and "4" are invoked, the microprocessor 18 automatically recognizes that four successive, associated (belonging to one block 17), only slightly different picture symbols (picture sequences) with an associated tone sequence are to be transmitted. On this basis, an abbreviated short message can be formed in such a way that the short message merely reads "heartabcdm1." The short message thus consists of a root "heart," which characterizes the entire picture sequence, and the associations "abcd" and "m1" corresponding to the tone sequence which corresponds to the individual picture sequences. This transmitted short message 22 clearly requires less data than the succession of individual picture sequences with at least one tone sequence. The microprocessor 18 at the receiving end then correspondingly reconverts the message and causes their pictures to be displayed on the display device 26 and reproduction on a loudspeaker 27.

To identify the short message 22 for the receiver as a transmission of associated picture sequences together with a tone sequence, an identifier can be added, for example by the "#" key. The short message will then consist of the character sequence of variant 1, "heartaheartbheartcheartdm1#" or of the preferred short variant 2 "heartabcdm1#."

Of course, the transmitter 12 can also select only individual picture sequences, for example two, from a block of associated picture sequences. These are then transmitted as a short message. For example, the ordinal numbers "2" and "4" can be selected from the block of ordinal numbers "1," "2," "3," and "4." In this case, either "heartbheartdm1#" or "heartbdm1#" is transmitted as the short message. Corresponding to the actually available number of associated picture sequences, various different possibilities result for transmitting moving pictures consisting of several individual picture sequences together with the musical background associated with the sequence "m1."

Figure 38:
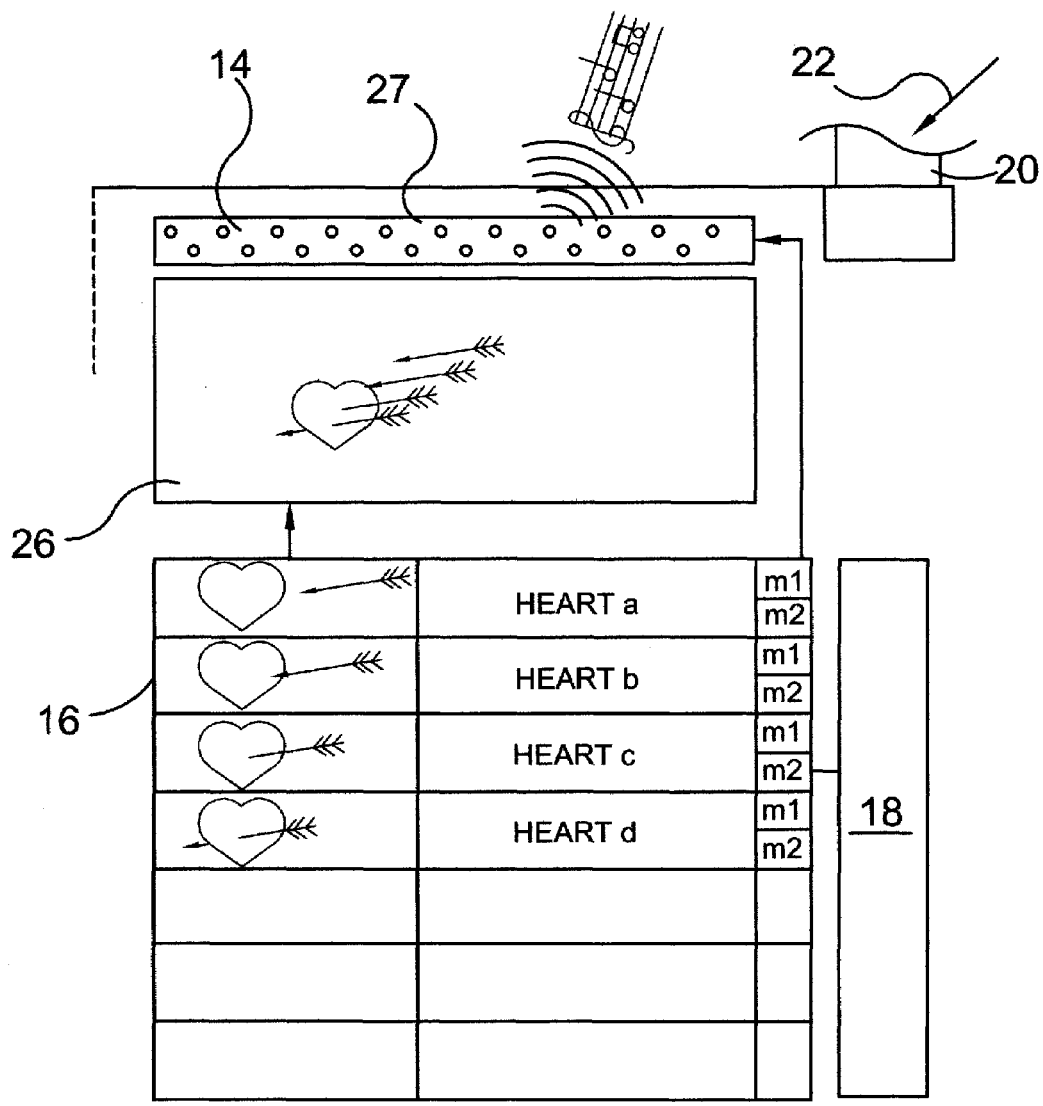
FIG. 38 shows a block circuit diagram for receiving moving pictures with tone sequences.

FIG. 38 again schematically elucidates reception of the short message 22 at the receiver 14. Through the transmission and reception device 20, the microprocessor 18 obtains the short message 22, and transmits this to the memory unit 16. The speech expressions are uniquely associated with the picture sequences and so are the character sequence "m1" with the tone sequences. Thus the time progression of the individual picture sequences can be displayed on the display device 26 and at the same time the associated tone sequence can be reproduced on the loudspeaker 27, corresponding to the received short message 22.

In the chosen example, the "heart," as a constant, identical picture component, needs to be displayed only once, while the approaching "error" is alternatingly displayed in its four flight phases, corresponding to the ordinal numbers "1," "2," "3," and "4," which were prescribed at the transmission end. The four flight phases of the arrow, which naturally are displayed one after the other, are schematically indicated on the display device 26 in FIG. 29. A viewer of the display device 26 consequently sees an arrow approaching the heart, while at the same time a musical background is played on the loudspeaker 27.

The microprocessor circuit 18 can have an appropriate loop circuit, by which the symbols which were transmitted as the short message 22 and which were converted, via the memory unit 16, into the picture sequences and the tone sequences respectively, can be displayed repetitively. This can continue until an operator at the receiver 14 interrupts or terminates the moving picture information.

The short message 22 can be retrieved and thus the moving pictures can be displayed and the tone sequences reproduced either immediately after the short message 22 has been received or also later. For this purpose, there is a facility for intermediate storage, until the operator of the receiver 14 retrieves the short message 22.

In the embodiment under discussion, it was assumed that a tone sequence "m1" or "m2" was already associated with the block 17 on the transmitting end. It can also be arranged that, on the receiving end, a tone sequence "m1," "m2," or another tone sequence "mx" is retrieved automatically when the short message 22 is received, and is reproduced by a loudspeaker 27. This makes it unnecessary for the transmission end to associate a particular tone sequence.

Figure 39:
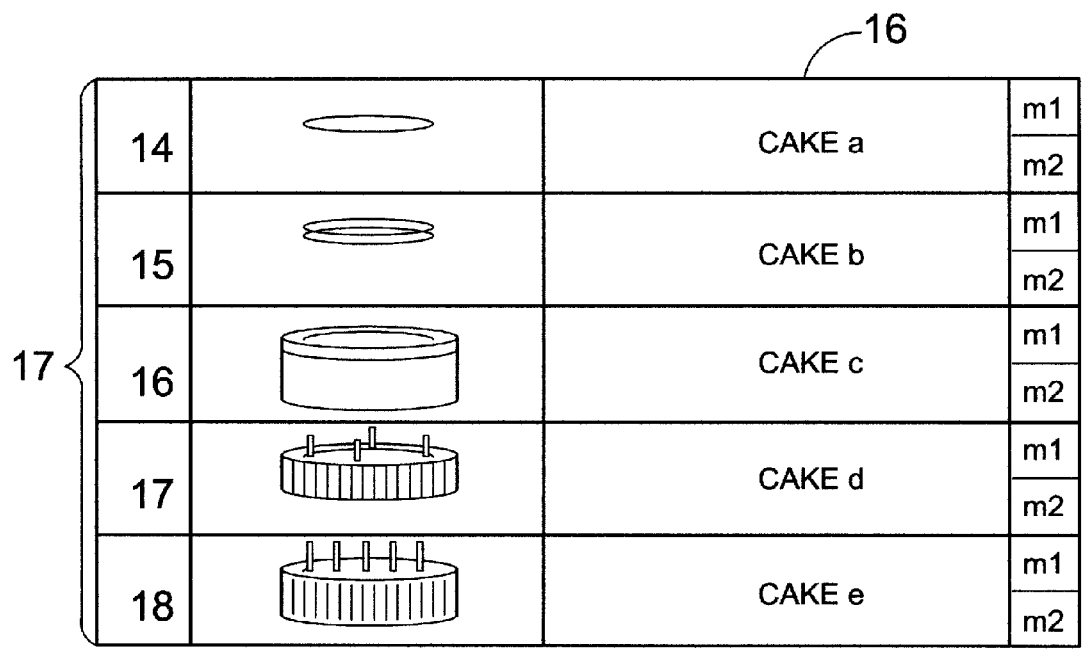
FIGS. 39 and 40 schematically show further possibilities for transmitting moving pictures with tone sequences.
Figure 40:
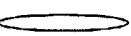

FIGS. 39 and 40 show more embodiments, which relate to various picture sequences for transmitting moving pictures with simultaneous reproduction of at least one tone sequence. The storage means 16 are shown in each case schematically, related picture sequences in a block 17 always being shown with their associated ordinal numbers. As regards the retrieval and transmission of the picture sequences with their associated tone sequences, shown by way of example in FIGS. 39 and 40, reference is made to the description of the FIGS. 36 to 38. According to FIG. 39, a moving picture consists in the representation of a birthday cake, consisting of, for example, a total of five picture sequences. In this connection, the sequences "m1" or "m2" are again respectively cited for the definition of the associated tone sequences. Accordingly, a short message 22 transmitted from the transmitter 12 to the receiver 14 could read "cakeacakebcakeccakedcakeem2" or, according to the short variant "cakeabcdem2."

FIG. 40 shows another example, in which the moving picture consists of four picture sequences, which represent a pair who approach one another, for example dancing. This embodiment shows that more than two, namely in this case four different tone sequences "m1," "m2," "m3," and "m4" can be associated with the moving pictures. For example, by selecting a particular one of these tone sequences, a different melody, for example a different dance rhythm can be defined, such as for example a waltz, tango, foxtrot, or the like.

Figure 41:
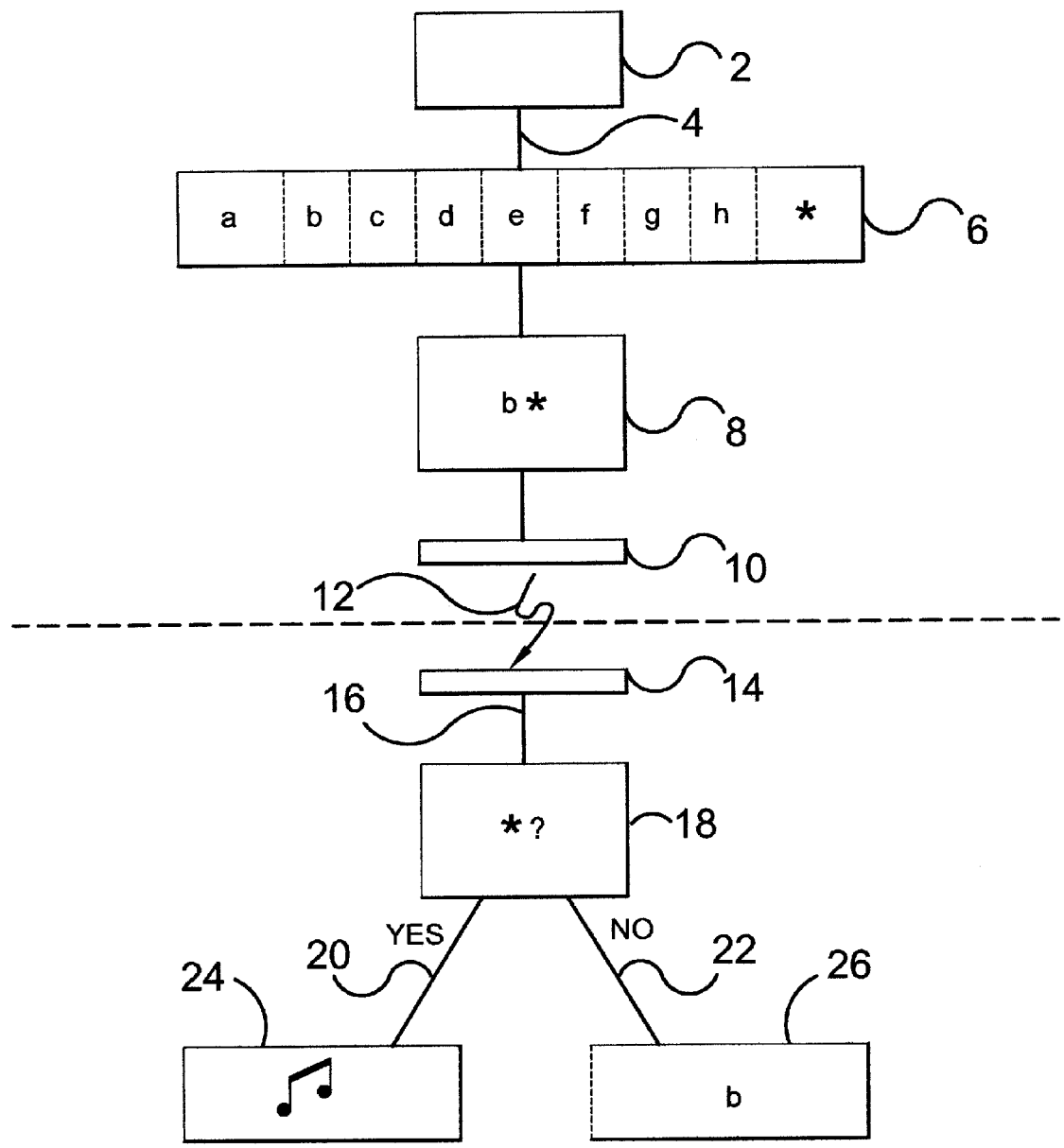
FIG. 41 schematically shows the procedure of the inventive method in accordance with an embodiment of the invention, by means of a schematically shown embodiment of an inventive device.

The device, shown as an example in FIG. 41, has a memory 2. The memory 2 is connected, through an electric line 4, to a touch screen 6, which serves as the inventive selection means. Furthermore, the memory 2 is connected, via an electric line (not shown) to a microprocessor 8.

In FIG. 41, the letters a-e are shown on the touch screen 6. These letters are each arranged on separate fields on the touch screen 6, which are here likewise designated a-e for the sake of simplicity. By means of the touch screen 6, a user of the device shown here consequently can select a letter on the touch screen 6 by touching the corresponding field.

A "*" is also shown on the touch screen 6. This "*" is also shown on a separate segment of the touch screen 6. This "*" provides the capability of choosing between two modes of the present device. If the user of the device chooses the "*" field on the touch screen 6, all the following letter selections of the user on the touch screen 6 are interpreted by the microprocessor 8 as the selection of a tone. The microprocessor 8 then adds to the selected letter an appropriate identifier, to identify it as a character embodying a tone signal or as a letter embodying a tone signal. Consequently, in the figure the microprocessor 8 schematically has the character combination "b*". This is supposed to symbolize that, when the user selects the "*" character on the touch screen 6, the microprocessor 8 is put into the mode in which it automatically interprets every character or every letter selected on the touch screen 6 as a letter embodying a tone signal. It will thus automatically append an appropriate identifier, in the present embodiment likewise an "*", to every letter which the user selects on the touch screen 6.

FIG. 41 also shows a transmitter 10. The transmitter 10 has an antenna (not shown) to transmit electromagnetic waves. The transmitter 10 can transmit the character sequences, which have been digitized by the microprocessor 8, in the present example the character sequence "b*", as a modulation of an electromagnetic wave. This transmission is symbolized by the arrow 12.

If the device shown here is to transmit a tone signal, it is first connected to a power supply (not shown) by means of a switch (also not shown). The power supply (not shown) supplies the memory 2, the touch screen 6, the microprocessor 8, and the transmitter 10. After the device has been turned on, the microprocessor 8 automatically actuates a retrieval process, which causes the letters a-e to be retrieved from the memory 2 via the line 4, and to be displayed on the touch screen 6. If the user now chooses the "*" mode on the touch screen 6, he thereby signals the microprocessor 8 that he, the user, wishes from now on to send tone signals by means of the device. If the user then again selects the appropriate letter on the touch screen 6, in the present figure the letter b, the microprocessor 8 adds the identifier "*" to this selection on the touch screen 6, and sends it off through the transmitter 10.

In FIG. 41, a receiver 14, complementary to the transmitter 10, is shown on the receiving end. The receiver 14 is connected, via an electric line 16, to a second microprocessor 18. The microprocessor 18 again is connected, via the lines 20 and 22, to a loudspeaker 24 and to a liquid crystal display 26.

The microprocessor 18 likewise can be connected to a power supply (not shown) through a switch (not shown). If it recognizes that the receiver 14 has received an information item carrying an "*", in the present example an appropriately identified letter "b", (in the figure, this recognition is schematically symbolized by a question mark behind the character "*", shown in the microprocessor field 18), the microprocessor 18 actuates the loudspeaker 24, via the line 20, and reproduces on the loudspeaker the tone corresponding to the letter b. Thus, in FIG. 41, the "yes" shown next to the electric line 20, means that the microprocessor 18 answers with yes the question whether the received character carried an identifier "*" to identify a tone, so that then the loudspeaker 24 is actuated. If, in the other case, that is in the case when the received character does not carry an identifier "*", the microprocessor 18 answers the corresponding question with no, the line 22 is actuated, and the letter itself is reproduced on a liquid crystal display 26.

The device shown above the dashed line in FIG. 41 can be, for example, a transmitting mobile telephone, while the device shown below the dashed line in the figure can be a receiving mobile telephone. The device shown above the dashed line can also be a computer, for example a personal computer, while the device shown below the dashed line likewise can be a personal computer, the two computers being connected to one another through a telephone line 12.

Of course, the embodiments presented here are purely exemplary. Any conceivable picture representation, especially if it can be represented schematically, can be transmitted by the inventive method as a moving picture, and an arbitrary tone sequence can be associated with it.

Figure 42:
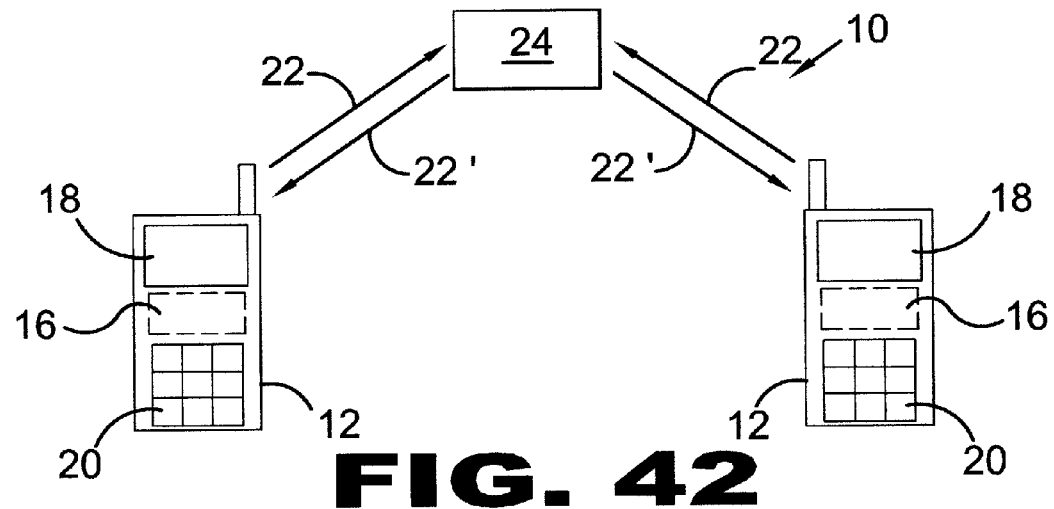
FIG. 42 schematically shows an arrangement for transmitting game information from a transmitter to a receiver.

FIG. 42 shows an arrangement 10 for transmitting game information from a transmitter 12 to a receiver 14. The transmitter 12 and/or receiver 14 can be, for example, mobile telephones, PCs, fax machines, communicators, laptops, notebooks, or the like. Terminal devices (telephones), which are connected to telecommunication systems, and which have an appropriate display, are also conceivable. The following embodiments assume that the transmitter 12 and the receiver 14 are each a mobile telephone. However, their functions can readily be transmitted to the other cited devices, and are included within the scope of protection of the invention.

It is assumed first of all that the operator of the transmitter 12 and the operator of the receiver 14 agree to begin a game. For this purpose, the operator of the transmitter 12—in a manner which will still be explained later—retrieves from a memory means 16 a game mask which is displayed on a display device 18, for example a display. The operator of the transmitter 12 then uses an alphanumeric control panel 20 to select a desired game action, for example placing a chess figure. This is transmitted as a short message 22 to a service provider 24. Service providers 24 are, for example, operators of mobile broadcasting systems, such as for example C-networks, D-networks, E-networks, or the like. The transmission of a short message 22, via a service provider 24, to a selected receiver 24 is generally known, so that it need not be discussed in more detail within the framework of the present description.

This short message 22 is transmitted to the receiver 14 via the service provider 24. In a manner that likewise still needs to be explained, the receiver 14 recognizes that the short message 22 relates to a game action of the transmitter 12. When the receiver 14 retrieves the short message 22, which need not necessarily happen immediately but can also happen at a later time, the receiver 14 recognizes the game action and, through a memory means 16, which is also present, the corresponding game mask is displayed on the display device 18, and the desired game action is visualized in the game mask. The operator of the receiver 14 can now react to the game action of the transmitter 12 with his own game action, for example placing a chess figure. For this purpose, the game action desired by the receiver is entered through the alphanumeric keyboard 20 of the receiver 14, and is transmitted as a short message 22', via the service provider 24, to the transmitter 12. In this response, the functions of transmitter and receiver are quasi interchanged. By mutually sending the short messages 22 and 22', a game, for example a chess game, can be played by the transmitter 12 and the receiver 14 over an extended period of time. The current game status is stored in the respective memory means 16, so that the game also can be interrupted. Continuation of the game is possible at any time, either through the transmitter 12 or the receiver 14, by transmitting the next game action due, as a short message 22 or 22'.

Figure 43:
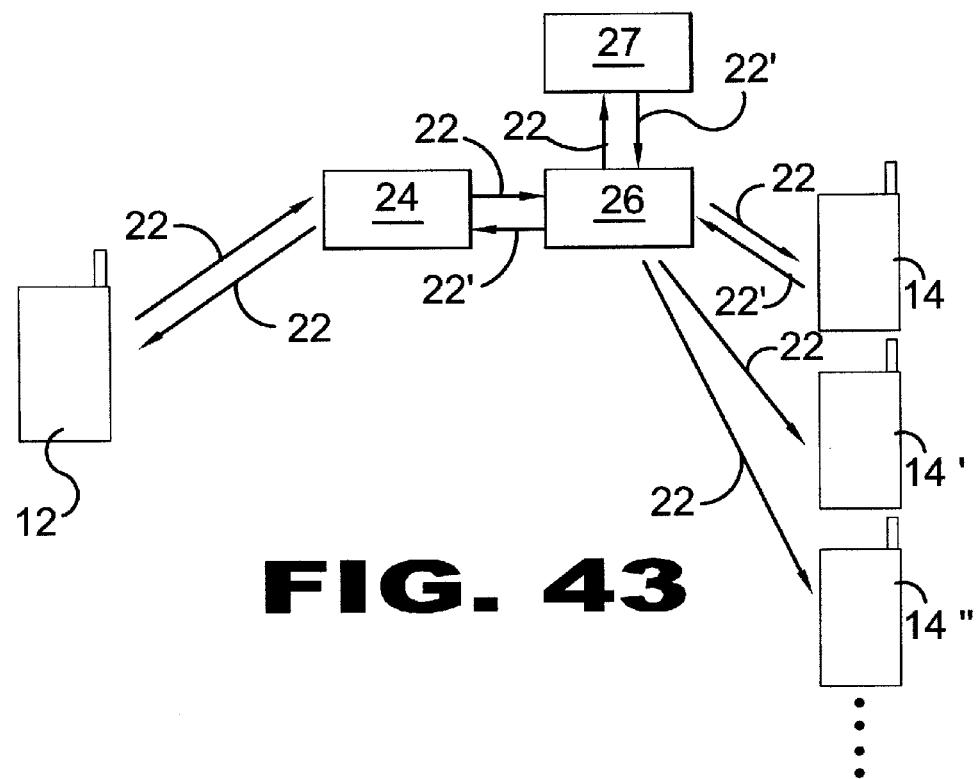
FIG. 43 shows an arrangement for transmitting game information from a transmitter to at least one receiver chosen from a plurality of receivers.

FIG. 43 clarifies another version of the method for transmitting game information from a transmitter 12 to at least one receiver 14, 14' and/or 14". The embodiment shown in FIG. 42 assumed that the transmitter 12 and the receiver 14 agree to begin a game. FIG. 43 shows the case in which a transmitter 12 would like to start a game, but at the moment does not have available a receiver 14 as a game partner. As already discussed in connection with FIG. 42, the game begins by transmitting a short message 22 to the service provider 24. The latter transmits this short message 22 to an exchange 26, who knows a plurality of potential receivers 14, 14', 14", who are interested in playing. The short message 22 of the transmitter 12 can now be sent by the exchange 26 to each potential receiver 14. In this connection, it can be arranged that the short message 22 is sent to all potential receivers 14 or only to those receivers 14 who have previously told the exchange 26 that they are waiting to receive a short message 22 containing a game action from any arbitrary transmitter 12.

After the short message 22 has been sent to all the potential receivers 14, the game exchange 26 waits for the first potential receiver 14 to send a short message 22' and thus to signal his readiness to start the game. The short message 22' can here immediately contain a game action in response to the game action of the transmitter 12. All other potential receivers 14 are then not included in the game. The example shown in FIG. 43 assumes that the receiver 14 was the first to send the short message 22' to begin the game.

Variants are also conceivable that the exchange 26 contacts several receivers 14 as game partners. In this way, games can especially be realized which permit more than two players. This can be for example "Halma," "Don't Get Mad," or the like. The exchange 26 and the service provider 24 then communicates the corresponding short messages 22 and 22' to all transmitters 12 and receivers 14, which are connected together in a conference circuit. The exchange 26 then also monitors and controls the order in which the short messages 22 and 22' from the individual participating transmitters 12 and receivers 14 are sent.

It is also possible that a game computer 27 is associated with the exchange 26, to take up the game with the transmitter 12 as needed. This can be the case, for example, if none of the receivers 14, 14', 14" is ready or willing to play, or the like.

According to anther variant, when the transmitter 12 starts a game, he can be connected to several receivers 14, 14' 14", so that he can exchange game information simultaneously with several receivers 14. For example, he can play "simultaneous chess" with the individual receivers 14. For this, the transmitter 12 has the game masks associated with individual receivers 14, 14', 14" stored in his memory element 16. After receiving the current short message 22' from one of the receivers 14, 14', 14", he retrieves the associated game mask into the display device 18. The individual receivers 14, 14', 14" can easily be associated with the transmitter 12 by means of the sender identifier (subscriber number assigned by the service provider) which is usually transmitted with short messages. A confusion among the games is thus prevented.

Figure 44:
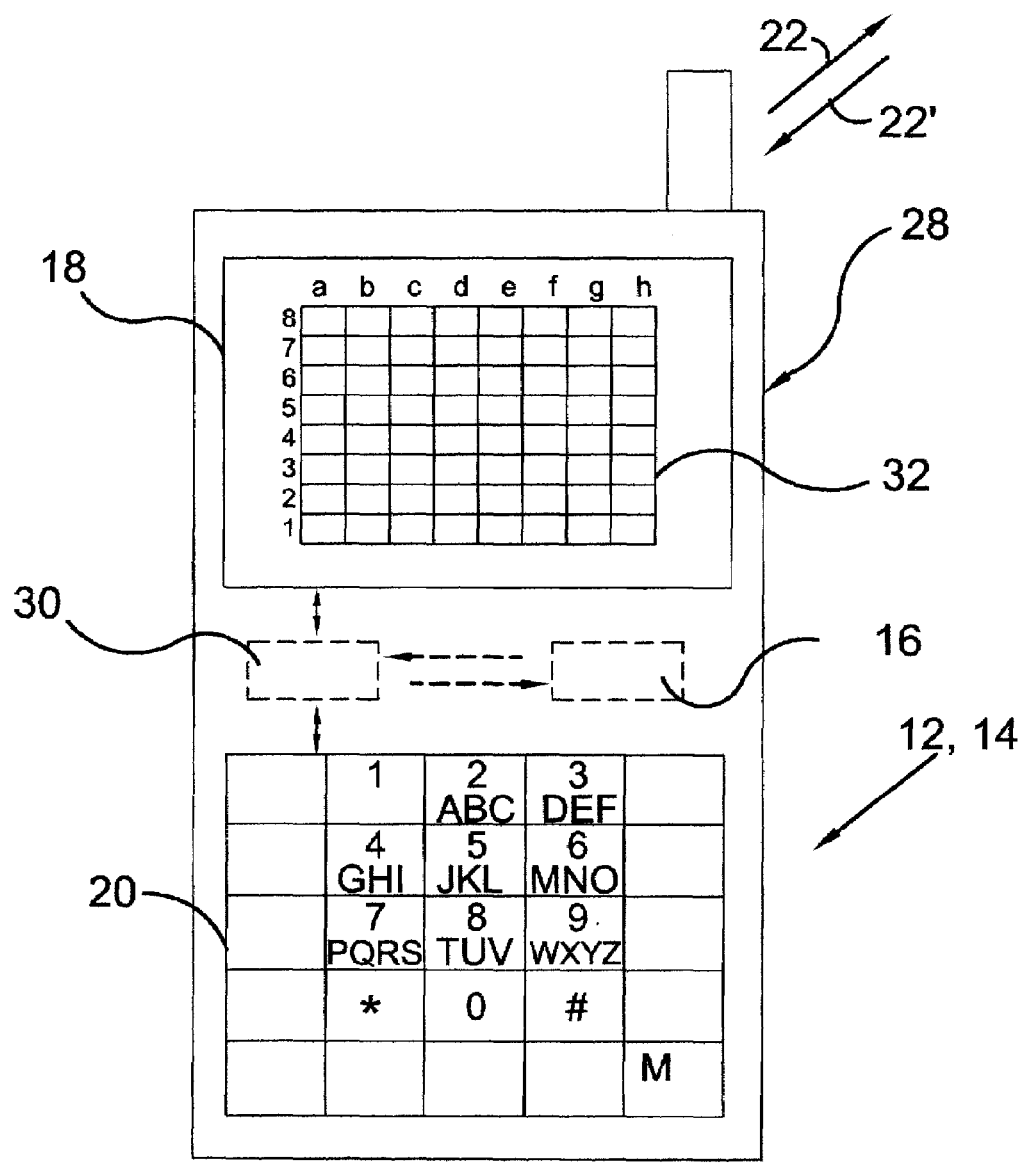
FIG. 44 schematically shows a view of a transmitter or receiver for transmitting game information.

FIG. 44 schematically shows a mobile telephone 28, which can be used as a transmitter 12 and/or a receiver 14, by means of the embodiments discussed in connection with FIGS. 42 and 43. The mobile telephone 28 comprises the display device 18, the alphanumeric keyboard 20, an integrated microprocessor 30, and the memory means 16. It also has a power supply, which is not shown. For example, this can be a rechargeable battery. The disposition of the individual elements is purely exemplary and naturally can also be different. For example, the keyboard 20 contains a menu key M, through which the games stored in the memory element 16 can be retrieved with menu guidance. In this way, several games can be stored, for example "chess," "Halma," "Hearts," "Sink the Ship," "Ladders," "Pyramid of Luck," "Dominos," "Pachisi®," "Don't Get Mad," or the like. The display device 18 shows a game mask 32 corresponding to the selection of a game by an operator. In the present example, it is assumed that the operator wishes to play chess, so that the "chess" game mask is shown on the display 18. For the sake of simplicity, FIG. 44 shows only the outlines with the individual assignments of the letters a to h and digits 1 to 8. The chess figures themselves have not been shown for reasons of clarity. For example, the display device 18 can show the actual figures. To simplify the representation, a letter can also be assigned to the individual chess figures, for example "B" for rook, "T" for castle, "S" for knight, "L" for bishop, "D" for queen, and "K" for king. An additional feature, for example a "." or the like can be used to distinguish between black and white pieces. The individual chess figures can also be associated with colors. In particular, when the mobile telephones have a color display, the game can be represented this way in simplified fashion. Different color intensities can be used to distinguish the black and white pieces.

As guided through the menu, the microprocessor 30 retrieves the appropriate game mask 32 from the memory element 16, and displays it. For this purpose, the microprocessor 30 is connected to the memory element 16, to the display device 18, and to the alphanumeric operating keyboard 20, as indicated by dashes in FIG. 44. The mobile telephone 28 further comprises transmission and reception devices, which, in addition to their usual functions, can also transmit the short messages 22 and receive the short messages 22'.

By means of the alphanumeric keyboard 20, an operator of the transmitter 12 can now select an opening move of the chess game. For example, if the knight is to be moved from B1 to C3, this is entered through the alphanumeric keyboard. When the game function is actuated, the alphanumeric keyboard 20 can be switched to game functions by the microprocessor 30. However, individual moves are also possible without switching the keyboard to game function. A key assignment of the keyboard 20 is indicated such as usually exists with mobile telephones. Multiple assignments of the individual number keys 1 to 0 are possible for entering the letters of the alphabet. Corresponding to the desired game action, for example knight B1 to C3, this move is entered through the keyboard 20, and is transmitted as a short message 22. To identify this short message 22 as a game move, an identifier can be added, for example with the "#" key, so that this short message will consist of the character sequence "SB1C3#". "S" here stands for knight, "B1" stands for the initial position, "C3" stands for the final position, and "#" stands for the identification as a game move.

This character sequence is received, via the service provider 24, by the receiver 14 or the receivers 14, 14', 14", corresponding to the possibilities discussed in connection with FIG. 42 and FIG. 43. The structure of the receiver 14 is basically the same as that of the transmitter 12. The character sequence is thus analyzed by the microprocessor 30 in the receiver 14 and, due to its identification by the character "#", it is recognized as a game move. If the receiver 14 at first does not know what game is involved, an additional identifier can be added in the form of a letter combination, a number combination, or the like, which, for example, uniquely identifies the move as belonging to the game of "chess." Thereupon, the microprocessor 30 retrieves the corresponding game mask from the memory element 16 and causes it to be displayed on the display device 18. This retrieval can occur either immediately or after the operator of the receiver 14 has read the short message. Until retrieval, the short message 22 is put into intermediate storage. When the game mask is retrieved on the receiving end, the transmitted game action of the transmitter 12 is simultaneously visualized on the display device 18, for example by displaying the move "knight B1 to C3." Either immediately or later, the operator of the receiver 14 can transmit a follow-up move as his game action, for example rook D7 to D6. The receiver 14 thereby takes over the transmission function, while the original transmitter takes over the receiving function. As the character sequence, "BD7D6#" would then be entered.

Corresponding to the exchange of the short messages 22 and 22' respectively, the transmitter 12 and the receiver 14 can carry on the chess game over an arbitrary period of time. The respective game mask 32 with the current status of the game is stored in the memory element 16 and can be retrieved with menu guidance M as needed. The game thus can also be played with quite large interruptions.

The invention claimed is:

1. A method for transmitting information containing a large volume of data from a first mobile telephone to a second mobile telephone with each mobile telephone having a microprocessor and a memory, comprising the steps in the order of:
   providing a form of information in a table stored in said memory of said first mobile telephone and at least one form of information in a table stored in said memory of said second mobile telephone, said form of information comprising at least one of graphic information and acoustic tones;
   associating a unique character string on the first mobile telephone, wherein said first mobile telephone is a transmitting mobile telephone, and on the second mobile telephone, wherein said second mobile telephone is a receiving mobile telephone, in a one-to-one manner and storing an association so created in said memory of said first mobile telephone and in said memory of said second mobile telephone;
   selecting a form of said information on the transmitting mobile telephone via said microprocessor of said first mobile telephone using an algorithm stored in the memory of said first mobile telephone;
   transmitting the character string associated with the form of said information selected from the transmitting mobile telephone to at least one said receiving mobile telephone;
   associating the character string received with the form of said information on the receiving mobile telephone; and,
   displaying the form of said information associated on a display device on the receiving mobile telephone when the form of said information is said graphic information and playing the form of said information on loudspeaker of said receiving mobile telephone when the form of information is said acoustic tones.

2. The method of claim 1, further comprising the step of adding an affix to the character string, on the transmitting mobile telephone, before the character string is transmitted, to identify the character string as said graphic information, the affix being transmitted together with the character string.

3. The method of claim 1, wherein, on the receiving mobile telephone, said graphic information associated with the character string received is found from a table of character strings and their associated graphic information.

4. The method of claim 1, wherein, on the receiving mobile telephone, associated said graphic information is found only for those character strings received carrying an affix identifying them as a coded form of graphic information.

5. The method of claim 1, wherein for said transmitting mobile telephone, said graphic information is retrievable from said table stored in said memory and the character strings associated with said graphic information are linked to one another and transmitted to said receiving mobile telephone.

6. The method of claim 1, wherein for said transmitting mobile telephone, said step of selecting a form of said information comprises selecting at least two related non-identical graphics information, said step of associating a unique character string comprises associating a character string with each of said at least two related non-identical graphics information on said transmitting mobile telephone, said step of transmitting the character string comprises transmitting the character strings associated with said at least two related non-identical graphics information to said receiving mobile telephone and converting a succession of character strings into associated graphics on said receiving mobile telephone, and said step of displaying the form of said information comprises displaying said associated graphics on a visual display device on said receiving mobile telephone and, simultaneously, at least one tone associated with said at least two related non-identical graphics information is acoustically reproduced.

7. The method of claim 1, wherein on said receiving mobile telephone, at least one sequence of said acoustic tones is permanently associated with graphical information in an one-to-one manner.

8. The method of claim 1, wherein said transmitting mobile telephone is able to effect a change in a sequence of said acoustic tones reproduced on said receiving mobile telephone.

9. The method of claim 1, wherein a plurality of sequences of said acoustic tones is able to be stored in said memory of said receiving mobile telephone with at least one sequence of acoustic tones of said plurality of sequences of said acoustic tones being retrievable by said transmitting mobile telephone.

10. The method of claim 1, wherein character strings associated with said graphical information and character strings associated with a sequences of said acoustic tones are retrievable from said table stored in said memory of said transmitting mobile telephone and, at least one of said character strings associated with said sequence of said graphical information and said character strings associated with said sequence of acoustic tones are transmitted to said receiving mobile telephone.

11. The method of claim 1, wherein for said transmitting mobile telephone, said step of selecting a form of said information comprises selecting at least two related non-identical graphics information, said step of associating a unique character string comprises associating a character string with each of said at least two related non-identical graphics information on said transmitting mobile telephone, said step of transmitting the character string comprises transmitting the character strings associated with said at least two related non-identical graphics information to said receiving mobile telephone and converting a succession of character strings into associated graphics on said receiving mobile telephone, and said step of displaying the form of said information comprises displaying said associated graphics on a visual display device on said receiving mobile telephone.

12. The method of claim 11, wherein said at least two related non-identical graphics information corresponds to picture sequences of a moving picture.

13. The method of claim 11, wherein said at least two related non-identical graphics information are collected together into one block of information.

14. The method of claim 13, wherein said at least two related non-identical graphics information collected together into one said block of information differ only in a modification, addition or affix that characterizes a respective position of a picture in said block of information.

15. The method of claim 1, further comprising the step of adding an affix to the character strings representing a transmitted sequence of said graphical information, said graphical information being a sequence of pictures.

16. The method of claim 15, wherein at least for said transmitting mobile telephone, an ordinal number is assigned to each said transmitted sequence of said graphical information for identifying each said sequence of pictures.

17. The method of claim 16, wherein when a first ordinal number within one said transmitted sequence of said graphical information is selected, each said sequence of pictures associated with said first ordinal number is retrieved from said memory of said transmitting mobile telephone and transmitted.

18. The method of claim 16, wherein a partial selection of at least two ordinal numbers is made from an available selection of ordinal numbers, only said sequence of pictures corresponding to said partial selection of said at least two ordinal numbers are transmitted by said transmitting mobile telephone.

19. The method of claim 1, further comprising the steps of:
collecting said graphical information for forming a sequence of related pictures;
collecting said acoustic tones for forming a sequence of related tones; and,
combining said sequence of related pictures and said sequence of related tones into a single block of information.

20. The method of claim 19, further comprising the step that when selecting said sequence of related pictures, all pictures of said sequence of pictures and at least associated said sequence of related tones belonging to said single block of information is automatically included in a transmission from said transmitting mobile telephone to said receiving mobile telephone.

21. A mobile telephone for transmitting or receiving graphic information or acoustic information, or both, comprising:
a memory;
a microprocessor for interacting with said memory for storing at least one graphic and at least one acoustic tone;
means for associating a character string having at least one character with said at least one graphic and at least one character with said at least one acoustic tone stored in said memory;
means for selecting said at least one graphic stored in said memory;
means for selecting said at least one acoustic tone stored in memory;
means for transmitting or receiving said character string associated with said at least one graphic and at least one acoustic tone stored in said memory selected with respective said means for selecting;
means for displaying said at least one graphic; and
a loudspeaker for playing said at least one acoustic tone.

22. The mobile telephone for transmitting or receiving graphic information or acoustic information, or both, according to claim 21, wherein said at least one acoustic tone is a sequence of acoustic tones and said at least one graphic is a sequence of pictures, said microprocessor interacting with said memory for storing said sequence of acoustic tones and for storing said sequence of pictures in said memory with a character string comprising said sequence of acoustic tones being associated with said sequence of pictures able to be transmitted or received by said means for transmitting or receiving, and said loudspeaker including means for audio reception of said character string comprising said sequence of acoustic tones associated with said sequence of pictures so transmitted.

23. The mobile telephone for transmitting or receiving graphic information or acoustic information, or both, according to claim 21, further comprising means for distinguishing a coded character string from a non-coded expression.

24. The mobile telephone for transmitting or receiving graphic information or acoustic information, or both, according to claim 23, wherein said means for distinguishing including means for recognizing an affix added to said coded character string for allowing the affix to indicate to said means for distinguishing that said coded character string is a coded graphic.

25. A mobile telephone for transmitting graphic information and acoustic information, comprising:
a memory for storing graphic information and acoustic information;
means for selecting at least a portion of said graphic information stored in said memory;
means for selecting at least a portion of said acoustic information stored in said memory;
means for associating a character string with at least said portion of said graphic information and with at least said portion of said acoustic information selected via respective said means for selecting;
means for identifying said character string as a coded graphic, or a group of graphics, and a sequence of acoustic tones; and,
means for transmitting said character string.

26. The mobile telephone for transmitting graphic information and acoustic information, according to claim 25, wherein said memory includes a table comprising at least one graphic and a character string associated with said graphic included in said table.

27. The mobile telephone for transmitting graphic information and acoustic information according to claim 25, wherein said memory includes a table comprising at least one acoustic tone and a character string associated with said acoustic tone included in said table.

28. A mobile telephone for receiving graphic information and acoustic information, comprising:
means for receiving a character string;
means for distinguishing a coded character string from a non-coded expression;
means for associating a graphic or a group of graphics with said coded character string received by said means for receiving;
means for associating an acoustic tone, or a sequence of acoustic tones, with said coded character string received by said means for receiving; and,
a loudspeaker for playing said acoustic tone or said sequence of acoustic tones.

29. The mobile telephone for receiving graphic information and acoustic information according to claim 28, wherein said means for distinguishing including means for recognizing an affix added to said coded character string for allowing the affix to indicate to said means for distinguishing that said coded character string includes a coded graphic.

* * * * *